(12) United States Patent
Sankovic et al.

(10) Patent No.: US 10,428,478 B2
(45) Date of Patent: Oct. 1, 2019

(54) EXPANDABLE CONTAINMENT PLOW

(71) Applicant: Meyer Products, LLC, Cleveland, OH (US)

(72) Inventors: Denis Sankovic, Euclid, OH (US); Craig Kemmerling, Twinsburg, OH (US); Thomas Miller, Waterloo, IN (US)

(73) Assignee: Meyer Products, LLC, Cleveland, OH (US)

( * ) Notice: Subject to any disclaimer, the term of this patent is extended or adjusted under 35 U.S.C. 154(b) by 157 days.

(21) Appl. No.: 15/274,460

(22) Filed: Sep. 23, 2016

(65) Prior Publication Data

US 2017/0089021 A1    Mar. 30, 2017

Related U.S. Application Data

(60) Provisional application No. 62/232,608, filed on Sep. 25, 2015.

(51) Int. Cl.
| | |
|---|---|
| *E01H 5/06* | (2006.01) |
| *B60Q 1/18* | (2006.01) |
| *B60Q 5/00* | (2006.01) |
| *E01H 5/04* | (2006.01) |

(52) U.S. Cl.
CPC .............. *E01H 5/066* (2013.01); *B60Q 1/18* (2013.01); *B60Q 5/00* (2013.01); *E01H 5/04* (2013.01); *E01H 5/061* (2013.01); *E01H 5/065* (2013.01)

(58) Field of Classification Search
CPC ........... E01H 5/066; E01H 5/04; E01H 5/061; E01H 5/065
See application file for complete search history.

(56) References Cited

U.S. PATENT DOCUMENTS

| | | | | |
|---|---|---|---|---|
| 1,544,859 A | | 7/1925 | George | |
| 3,486,567 A | * | 12/1969 | Weaver ................. | E02F 3/7668 172/460 |
| 3,528,685 A | * | 9/1970 | Eastman .............. | A01B 59/062 172/272 |
| 3,577,713 A | * | 5/1971 | McCarty .............. | A01D 34/246 172/466 |
| 3,613,800 A | * | 10/1971 | Martin ................... | A01B 31/00 172/445.2 |
| 3,675,725 A | * | 7/1972 | Schultz ................ | A01B 21/086 172/245 |

(Continued)

OTHER PUBLICATIONS

Kremsler, Stefan, Extended European Search Report, dated Apr. 9, 2019, Munich.

*Primary Examiner* — Jamie L McGowan
(74) *Attorney, Agent, or Firm* — Emerson Thomson Bennett; Roger D. Emerson; Timothy D. Bennett

(57) ABSTRACT

Provided is a material handling assembly, such as a plow, that may contain additional features mounted thereon so as to increase the functionality of the assembly, and an apparatus and method for mounting such an assembly or other like structure onto a vehicle, such as a truck. A plow mounting apparatus may be used for automatically mounting and dismounting a plow blade to an end of an associated vehicle. The plow mounting apparatus includes a plow assembly comprising: an expandable plow blade; a lift frame; an auxiliary light mounting apparatus;h a height adjustment mechanism; and, a vertical pull structure.

10 Claims, 15 Drawing Sheets

(56) References Cited

U.S. PATENT DOCUMENTS

| | | | |
|---|---|---|---|
| 4,236,329 A * | 12/1980 | Hetrick | E01H 5/06 172/273 |
| 4,692,845 A | 9/1987 | Widhalm et al. | |
| 4,722,030 A | 1/1988 | Bowden | |
| 4,928,216 A | 5/1990 | Carr | |
| 4,962,598 A | 10/1990 | Woolhiser et al. | |
| D347,902 S | 6/1994 | Stutts | |
| 5,428,520 A | 6/1995 | Skief | |
| 5,481,441 A | 1/1996 | Stevens | |
| 5,690,419 A | 11/1997 | Siems | |
| RE35,700 E | 12/1997 | Watson et al. | |
| 5,829,174 A * | 11/1998 | Hadler | E01H 5/06 37/234 |
| 5,876,011 A | 3/1999 | Blasing | |
| 5,894,688 A * | 4/1999 | Struck | E01H 5/066 37/234 |
| 5,924,223 A | 7/1999 | Hone, Jr. | |
| 5,987,785 A | 11/1999 | Aguado et al. | |
| 6,354,024 B1 * | 3/2002 | Kost | E01H 5/06 172/273 |
| 6,526,677 B1 | 3/2003 | Bloxdorf et al. | |
| 6,618,964 B2 | 9/2003 | Kost | |
| 6,860,039 B2 | 3/2005 | Schultz et al. | |
| 6,874,582 B2 | 4/2005 | Hollinrake et al. | |
| 7,114,270 B2 * | 10/2006 | Potak | B60R 9/06 37/231 |
| 7,228,650 B2 | 6/2007 | Curtis | |
| 7,461,702 B2 * | 12/2008 | Farnsworth | A01B 59/066 172/439 |
| 7,513,069 B1 * | 4/2009 | Gamble, II | E01H 5/066 37/231 |
| 7,526,883 B2 | 5/2009 | Musso, Jr. et al. | |
| 7,574,820 B2 * | 8/2009 | Musso, Jr. | E01H 5/066 172/273 |
| 7,681,334 B2 * | 3/2010 | LeBlond | E01H 5/066 172/274 |
| 7,954,262 B2 * | 6/2011 | Bernier | E01H 5/06 172/272 |
| 8,763,715 B2 | 7/2014 | Osgood | |
| 8,793,907 B2 | 8/2014 | Walimaa et al. | |
| 8,850,724 B2 * | 10/2014 | Bloxdorf | E01H 5/067 172/815 |
| 8,887,413 B2 | 11/2014 | Miller | |
| 2004/0088892 A1 | 5/2004 | Kost et al. | |
| 2005/0144814 A1 * | 7/2005 | Potak | B60R 9/06 37/234 |
| 2006/0185199 A1 | 8/2006 | Watros | |
| 2011/0225853 A1 | 9/2011 | Dilworth et al. | |
| 2015/0068780 A1 | 3/2015 | Miller | |

* cited by examiner

EXPANDABLE CONTAINMENT PLOW

RELATED APPLICATIONS

This application claims priority to U.S. Provisional Application 62/232,608, filed on Sep. 25, 2015, which is fully incorporated herein by reference.

TECHNICAL FIELD

The present subject matter is directed to material handling. More specifically, the present subject matter is directed to a material handling assembly, such as a plow, that may contain additional features mounted thereon so as to increase the functionality of the assembly, and an apparatus and method for mounting such an assembly or other like structure onto a vehicle, such as a truck.

BACKGROUND

Conventional plows come in a variety of forms but are typically fixed in length. This fixed length limits the flexibility of the plow in the sense that a longer plow or a shorter plow is sometimes desirable depending on the nature of the job to be performed or on the conditions under which the plow and associated vehicle may be transported during or between jobs. That is, it is sometimes desirable to make use of a longer plow so that longer, and correspondingly larger, swaths of a given area to be plowed can be plowed over a given time so as to reduce the time associated with plowing the given area. On the other hand, it sometimes desirable to have a shorter plow to allow for ease of transport on public highways or to plow around barriers and other like obstructions. Accordingly, a plow that has an adjustable width which is able to be either expanded or contracted may offer a user desirable, but otherwise unavailable, flexibility.

In some applications it is desirable to provide end forms or wings to a plow in order to promote containment of material being plowed. Such plows with end forms or wings may be referred to as containment plows. It remains desirable to provide improvements in material handling devices directed to containment plows which are adapted to be adjustable in width.

Similarly, the mounting of material handling devices, such as plows to an associated vehicle, is a matter of particular interest. In some mounting assemblies, a material handling device such as a plow blade assembly, is attached to a vehicle mounting frame through the vertical extension and retraction of a hydraulic cylinder which controls the engagement of upper and lower hooks onto the vehicle mounting frame.

While there are advantages to such mounting assemblies, there are also several disadvantages. First, once the material handling device is installed on the associated vehicle, the hydraulic cylinder must stay under pressure to prevent the mounting assembly from disengaging. Additionally, as the only means for keeping the frame in place on the front of the vehicle, the hydraulic cylinder is continually subjected to lateral and rotational forces and/or torques throughout the normal course of usage of the material handling device. These forces and/or torques may cause premature wearing of the hydraulic cylinder, causing the cylinder to break. For example, a seal on the hydraulic cylinder may break or "blow", resulting in failure of the hydraulic cylinder. In a plowing device, this typically results in the failure of the entire plow blade assembly. Without a properly functioning hydraulic cylinder, the plow blade assembly cannot remain attached to the vehicle mounting frame. In such circumstances, either the hydraulic cylinder would have to be repaired or replaced, or an entirely new plow blade assembly would have to be purchased.

In relation to the vehicles on which the material handling device may be mounted, such as trucks and automobiles, auxiliary lights are light sources that are used to supplement a vehicle's standard and original lighting. Some common examples of auxiliary lights are fog lights, spotlights, and snow plow lights. These lights find uses in activities such as off-road driving, driving in inclement weather and plowing snow. Typically, these auxiliary lights are mounted on the frame of a snow plow or some other external component or attachment to the vehicle.

Existing auxiliary light systems commonly include one or more sealed beam headlights within an auxiliary light housing assembly. Due to the size and weight of conventional sealed beam auxiliary lights, such lights are often limited to specific locations or areas where they can be mounted on a vehicle. As a result of this mounting limitation, many of these lights are permanently connected to their mounting structure, making adjustment and replacement of the lighting components difficult.

Due to the size and nature of a typical plow assembly (e.g., a snow plow assembly), the plow vehicle's standard headlights are normally blocked by the plow blade and overall snow plow assembly in general. Thus, the plow vehicle's headlights cannot fulfill their normal function of illuminating the road. This creates a hazardous and dangerous condition for the driver, as well as other traffic on the road. In addition, operating a vehicle under conditions which require the use of a snow plow (e.g., inclement weather) without functional headlights violates many traffic safety regulations. Thus, the industry solution has long been to mount these auxiliary lights on the frame of the snow plow to essentially take over the function of the vehicle's standard headlight system.

Many jurisdictions in the United States have traffic regulations requiring that headlights, including plow lights that are functioning as headlights, maintain specific angles and heights so that the lights of one vehicle do not create hazardous conditions for drivers of other vehicles. Thus, the placement of auxiliary snow plow lights often must fall within the proper height and angle range requirements set by local law. Current lighting systems attempt to meet this requirement by placing the lights at a fixed point above the snow plow blade in a "one-size-fits-all" type solution. Given the large diversity of vehicles being used to plow snow, this "one-size-fits-all" approach is no longer viable. What is needed is an auxiliary lighting mount for a plow assembly that is sturdy yet adjustable to account for variations in height between different plow assemblies and vehicles.

It remains desirable to provide a material handling device mounting apparatus that can be quickly and easily mounted to an associated vehicle, which overcomes the issues of rotational and lateral forces prematurely wearing on the hydraulic cylinder during normal use, provides a mechanical backup for retaining the plow assembly on the vehicle in the event of a hydraulic cylinder failure, and is capable of accommodating additional features which may be present on the snow plow assembly.

SUMMARY

Provided is a plow mounting apparatus for automatically mounting and dismounting an expandable plow blade assembly to an end of an associated vehicle. The plow mounting apparatus includes a plow assembly comprising an expandable plow blade pivotally attached to a front portion of a plow frame; a lift frame attached to a rear portion of the plow frame; and a height adjustment mechanism that is operable to raise and lower the plow blade assembly relative to the ground. The plow frame may further have additional features mounted thereon, such as an adjustable auxiliary lighting assembly. The height adjustment mechanism includes a hydraulic cylinder having a top portion and a bottom portion; wherein the bottom portion of the hydraulic cylinder is attached to a foot member; the top portion of the hydraulic cylinder is attached to the lift frame; and a vertical pull structure which is attached to the lift frame. The vertical pull structure includes an outer vertical sleeve and an inner vertical member which is slidingly engageable with the outer vertical sleeve.

According to further aspects of the present disclosure, the vehicle mounting frame includes an upper cross member and a lower cross member and the vehicle mounting frame is semi-permanently attached to the chassis of the associated vehicle. An adjustable auxiliary lighting assembly may further be attached to the mounting frame.

According to further aspects of the present disclosure, the plow frame is an A-frame.

According to further aspects of the present disclosure, the A-frame includes two side members and a rear member forming an A-shaped structure. The rear member of the A-frame includes a first pivotal mount and a second pivotal mount along its top surface. The first pivotal mount and the second pivotal mount have an axis of rotation which allows for pivotal attachment of a clevis frame to the first pivotal mount and the second pivotal mount.

According to further aspects of the present disclosure, the lift frame includes a pair of upper hooks which engage the upper cross member on the vehicle mounting frame.

According to further aspects of the present disclosure, the clevis frame includes a pair of lower hooks which engage the lower cross member on the vehicle mounting frame.

According to further aspects of the present disclosure, the clevis frame includes a horizontal cross member between the first pivotal mount and the second pivotal mount and wherein the clevis frame is pivotable along the axis of the first and second pivotal mount relative to the plow frame.

According to further aspects of the present disclosure, the inner vertical member has a bottom end which is attached to the horizontal cross member of the clevis frame.

According to further aspects of the present disclosure, the outer vertical sleeve is attached to a cross member on the lift frame.

According to further aspects of the present disclosure, the bottom portion of the hydraulic cylinder is pivotally attached to the foot member and wherein the foot member comprises a metal plate.

According to further aspects of the present disclosure, the foot member supports the plow assembly off of a ground surface when the plow assembly is not installed on the associated vehicle.

According to further aspects of the present disclosure, the foot member and hydraulic cylinder are positioned within an interior portion within the A-frame.

According to further aspects of the present disclosure, the foot member further includes a foot member-clevis frame connecting member that permanently attaches the foot member to the horizontal cross member of the clevis frame.

According to further aspects of the present disclosure, the foot member-clevis frame connecting member is angled to extend upward from the foot member and to pass over the top portion of the rear member of the A-frame.

According to further aspects of the present disclosure, the foot member, hydraulic cylinder, clevis frame, lift frame and vertical pull structure pivot as a single unit along the axis of rotation between the first and second pivotal mount on the rear member of the A-frame.

According to further aspects of the present disclosure, the outer vertical sleeve comprises a hollow cylindrical structure and an inner vertical member includes an inner cylindrical structure.

According to further aspects of the present disclosure, the outer vertical sleeve has an aperture, the inner vertical member has an aperture and wherein the outer vertical sleeve and the inner vertical member may be slidingly engaged so that the corresponding apertures on the outer vertical sleeve and the inner vertical member overlap.

According to further aspects of the present disclosure, a locking mechanism is disposed within the aperture of the outer vertical sleeve and the locking mechanism may engage the aperture on the inner vertical member to mechanically lock the outer vertical sleeve and the inner vertical member of the vertical pull structure into a fixed position relative to each other.

According to further aspects of the present disclosure, the locking mechanism is an automatic locking pin.

Also provided is an auxiliary light mounting apparatus which may be further mounted to a plow assembly. The auxiliary light mounting apparatus includes a lift frame having a first side member and a second side member; a cross member positioned between the first side member and the second side member of the lift frame, wherein the cross member has a first end and a second end having an inner diameter and an outer diameter, the cross member having at least one aperture at a first end and at least one aperture at a second end of the cross member; a first horn having a first end and a second end having an inner diameter and an outer diameter, wherein the outer diameter of the first end of the first horn is less than the inner diameter of the first end of the cross member, wherein the first end of the first horn is positioned within the first end of the cross member and wherein the first horn has at least one aperture positioned to overlap the at least one aperture at the first end of the cross member; a second horn having a first end and a second end having an inner diameter and an outer diameter, wherein the outer diameter of the second horn is less than the inner diameter of the second end of the cross member, wherein the first end of the second horn is positioned within the second end of the cross member and wherein the second horn has at least one aperture positioned to overlap the at least one aperture in the second end of the cross member; at least one first auxiliary light housing positioned at a top portion of the first horn and at least one second auxiliary light housing positioned at a top portion of the second horn; at least one light positioned within the first and second auxiliary light housings; and a pin inserted within the overlapping apertures of the first and second horns and the cross member.

According to further aspects of the present disclosure, the lift frame is a component part of a snow plow assembly.

According to further aspects of the present disclosure, the cross member is permanently attached to the first side member and second side member of the lift frame.

According to further aspects of the present disclosure, the cross member is the upper most cross member of the lift frame.

According to further aspects of the present disclosure, the cross member has a tubular structure having a circumference and the first and second horns have a bent, tubular structure having a circumference.

According to further aspects of the present disclosure, the cross member has at least one pair of apertures at its first end and at least one pair of apertures at its second end.

According to further aspects of the present disclosure, the cross member has a plurality of paired apertures disposed about the circumference of the cross member at the first end and the second end of the cross member.

According to further aspects of the present disclosure, the plurality of paired apertures comprises four sets of two apertures which are spaced at 90 degree intervals about the circumference of the cross member at the first end and the second end of the cross member.

According to further aspects of the present disclosure, the first horn and the second horn comprise at least one pair of apertures positioned to overlap the at least one pair of apertures at the first end of the cross member and the second end of the cross member.

According to further aspects of the present disclosure, the first horn has a plurality of paired apertures positioned to overlap the plurality of paired apertures at the first end of the cross member and the second horn has a plurality of paired apertures positioned to overlap the plurality of paired apertures at the second end of the cross member.

According to further aspects of the present disclosure, the first horn has four sets of two apertures spaced at 90 degree intervals about the circumference of the cross member at the first end of the cross member and the second horn has four sets of two apertures spaced at 90 degree intervals about the circumference of the cross member at the second end of the cross member.

According to further aspects of the present disclosure, the first horn comprises one first auxiliary light housing positioned at its top portion and the second horn comprises one second auxiliary light housing positioned at its top portion.

According to further aspects of the present disclosure, the first and second auxiliary light housings are respectively positioned on the top portion of the first and second horns through a pivotable bracket.

According to further aspects of the present disclosure, the first and second auxiliary light housings respectively mounted on the first and second horns comprise two auxiliary lights.

According to further aspects of the present disclosure, the two auxiliary lights comprise a high beam and a low beam.

According to further aspects of the present disclosure, the first and second auxiliary light housings further comprise a turn signal.

According to further aspects of the present disclosure, the second end of the first and second horns is capped.

The adjustable auxiliary lighting apparatus is able to be selectively mounted onto the frame of the plow such that the mounting apparatus of the adjustable containment plow assembly is able to retain all levels of functionality disclosed herein.

DETAILED DESCRIPTION

Provided is a plowing apparatus, plow assembly which may include an adjustable auxiliary lighting system, a plow mounting apparatus and a method for mounting a plowing apparatus onto an associated vehicle. The plowing apparatus is typically mounted on the front end of a vehicle although, it is possible to mount the plow assembly at the back end of a vehicle or, in theory, at other positions located about the vehicle.

The plow assembly may be in some non-limiting embodiments a material handling box. A material handling box may include a main blade, a guide frame, and a first wing blade assembly. Further details with respect to a main blade, a guide frame, and a first wing blade assembly, as well as additional components of the plow assembly, are provided in the various embodiments discussed below.

In one embodiment of the present subject matter a material handling box is adapted to telescope in width between a narrow configuration and one or more wider configurations.

Figure 9:
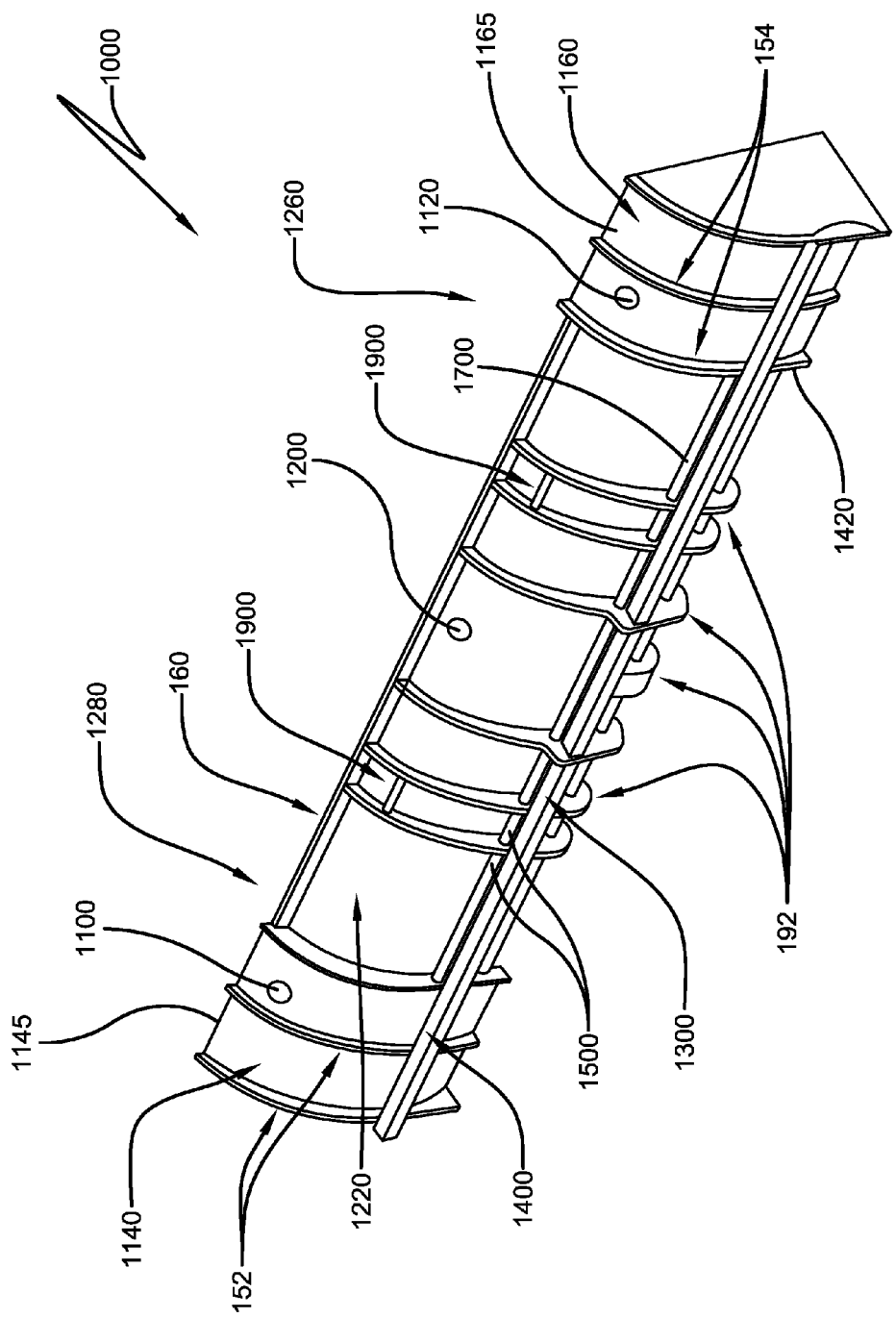
FIG. 9 is a rear perspective view of a first embodiment of an expandable containment plow.
Figure 10:
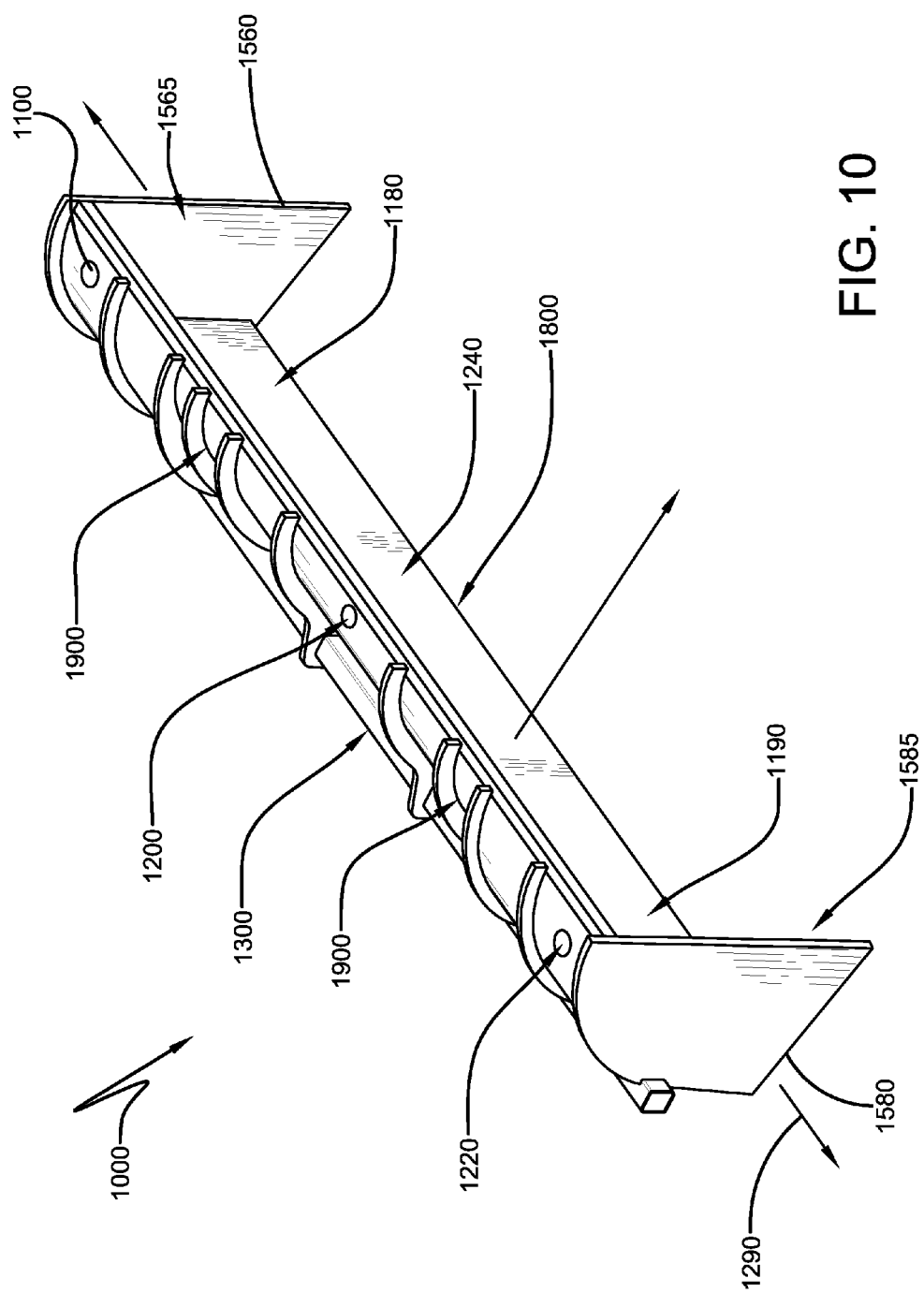
FIG. 10 is a front perspective view of the first embodiment of an expandable containment plow.

Referring now to FIGS. 9 and 10, a material box assembly 1000 may be used for moving material in applications such as landscape, agricultural, snow removal and the like. The material box assembly 1000 may include a main blade 1200, a guide frame 1300 and one or more adjustable wing blade assemblies 1100, 1120. The main blade 1200 may include a mount, such as the plow mounting apparatus 120 described below, adapted for operationally engaging the material box assembly 1000 to an associated vehicle. Mounts other than the plow mounting apparatus 120 may be used depending on the application.

The main blade 1200 has a plate 1800 having a flat or concave front surface 1240 and a flat or convex rear surface 1220. The main blade 1200 will have some width to it and may be elongated along its width to define a pair of lateral ends 1260, 1280 opposed to one another. The elongation in the width direction defines an axis of elongation 1290. The main blade 1200 may optionally comprise one or more flanges or other structures to enhance the strength of the material box assembly 1000. As used herein a flange may be referred to as a gusset 1500. In some embodiments, the main blade 1200 may comprise a plurality of laterally spaced apart gussets 1500. The gussets 1500 may be oriented such that they are substantially vertical, at a substantial angle to vertical or may be substantially horizontal. Herein, gussets 1500 that are substantially horizontal may also be referred to as ribs 1900. In some embodiments, the main blade 1200 may comprise a plurality of laterally spaced apart gussets 1500 engaged to rear surface 1220 but absent proximate to the lateral ends 1260, 1280. The selection of the placement of gussets may be made with good engineering judgement. In some embodiments, non-horizontal gussets are absent from the lateral ends 1260, 1280 in order to facilitate close-fitting, slidable engagement with one or more adjacent components such as, without limitation, a wing blade assembly as will be described below.

Guide frame 1300 may comprise a structure either offset from and indirectly engaged with the rear surface 1220 or engaged directly to rear surface 1220. The guide frame 1300 may provide structural support to, and enhance the strength of, the material box assembly 1000. The guide frame 1300 may be elongated and may extend in the width direction parallel to the axis of elongation 1290 for at least part of its length. In some non-limiting embodiments, the guide frame 1300 may extend the full width of the main blade 1200. The guide frame may be part of a slidable engagement set 1700. A slidable engagement set 1700 is a set of components which are adapted to operationally engage with one another such that the components may operate to slide with respect to one another along an operational axis of the slidable engagement set 1700. In some embodiments, the guide frame 1300 defines a first half of a first slidable engagement set having an operational axis substantially parallel to the axis of elongation 1290 and wherein the second half of the first slidable engagement set is a first wing blade assembly as described below. In some embodiments, the guide frame 1300 defines a first half of a first slidable engagement set having an operational axis substantially parallel to the axis of elongation 1290 wherein the second half of the first slidable engagement set is, or is a component of, a first wing blade assembly as described below, and the guide frame 1300 further defines a first half of a second slidable engagement set having an operational axis substantially parallel to the axis of elongation 1290 wherein the second half of the second slidable engagement set is, or is a component of, a second wing blade assembly as described below. The guide frame 1300 may have any suitable form chosen with good engineering judgment.

In some embodiments, the guide frame 1300 is composed of one or more of a channel, beam, strap, rod, or similar component. In some embodiments, the guide frame 1300 has a C-shaped cross section, a D-shaped cross section, a W-shaped cross section, a square cross section, a rectangular cross section, a circular cross section, or an I-shaped cross section. In some embodiments, the guide frame 1300 has a C-shaped cross section having a pair of opposing lips engaged to the rear surface where each of said lips extends toward the other lip.

Wing blade assembly 1140, 1160 may comprise a structure slidably engaged with guide frame 1300 and comprising a wing blade 1145, 1165 having a front surface 1190, 1180 positioned behind and curved to conform with the rear surface 1220 and a lateral edge plate 1580, 1560 defining a lateral containment surface 1585, 1565. A wing blade assembly 1140, 1160 may be slidably engaged with the first half of a slidable engagement set, such as without limitation, guide frame 1300, by a wing blade slide 1420, 1400 defining a second half of the slidable engagement set. In those non-limiting embodiments in which the wing blade assembly 1140, 1160 is slidably engaged with the first half of a slidable engagement set, the wing blade assembly 1140, 1160 may be moved along the operational axis of the first slidable engagement set such that the width of the material handling box assembly may be adjusted.

In embodiments in which a first wing blade assembly 1140 is slidably engaged with the first half of a first slidable engagement set 1300 by a wing blade slide 1420 defining a second half of the first slidable engagement set and in which a second wing blade assembly is slidably engaged with the first half of a second slidable engagement set 1300 by a wing blade slide 1400 defining a second half of the first slidable engagement set, the first lateral containment surface 1585 and the second lateral containment surface 1565 are moveable with respect to one another such that the distance therebetween defines the width of the material box assembly 1000.

The plow mounting apparatus may include a vertical pull structure to reduce, minimize, or prevent lateral and rotational movement of the plow assembly as it is being mounted on an associated vehicle and also during operation or use of the plow assembly. Also included as a component of the plow mounting apparatus is a foot member attached to a hydraulic cylinder. The foot member provides support and stability during the mounting, removal, and storage of the plow assembly. The plow mounting apparatus may be utilized for any type of plow assembly such as a material handling box or other plowing implement including, but not limited to, snow plow assemblies. Further details with respect to the vertical pull structure, hydraulic foot member and other components of the plow mounting apparatus are provided in the various embodiments discussed below.

Figure 1:
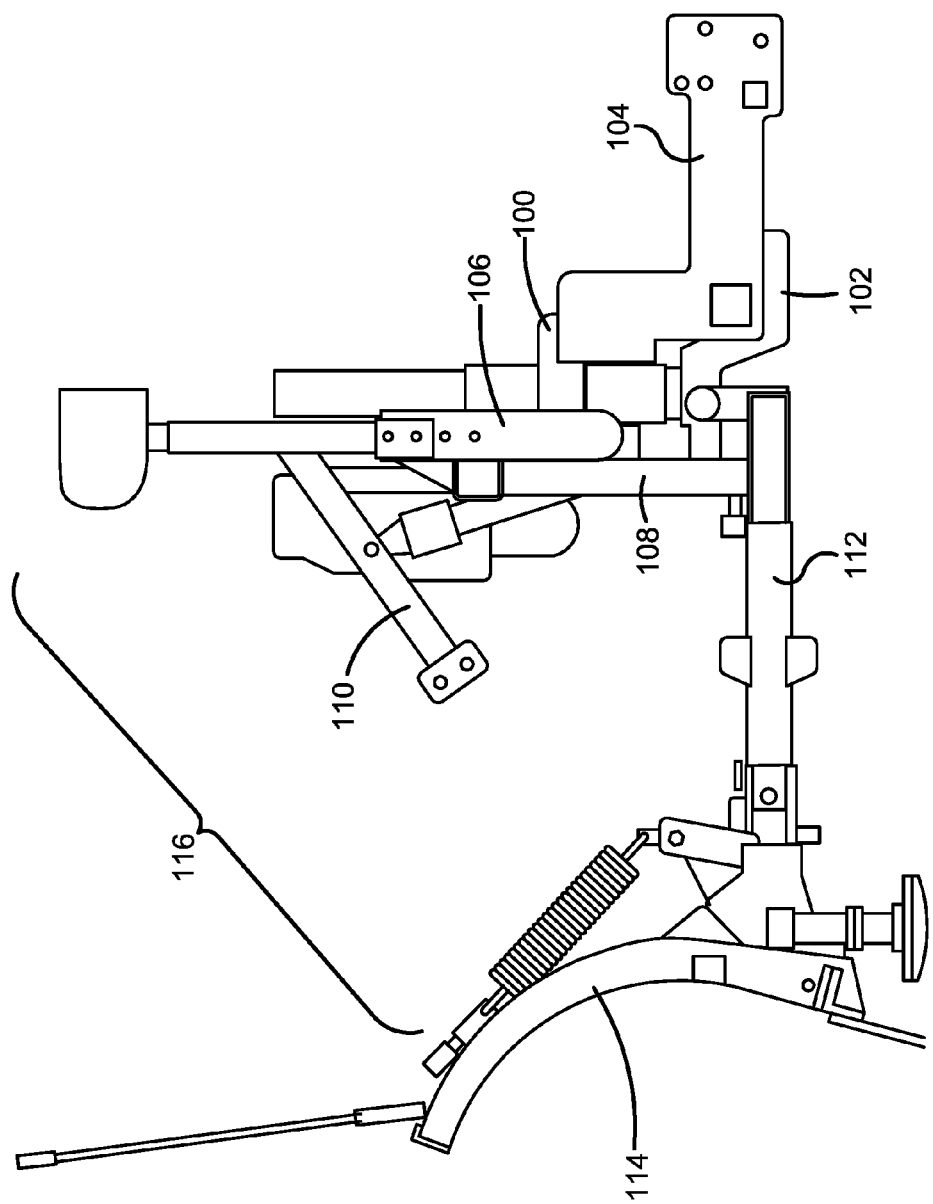
FIG. 1 is a side view of a plow mounting apparatus.

FIG. 1 illustrates an exemplary plow blade assembly 116 attached to a vehicle mounting frame 104. The plow blade assembly includes a plow blade 114, a plow frame 112 and a lift frame 106. The plow blade 114 is connected to the front portion of the plow frame 112 and the lift frame 106 is connected to the rear portion of the plow frame 112. The lift frame 106 includes a lift arm 110 which is pivotally connected to the upper portion of the lift frame 106. The lift arm 106 extends outwardly from the lift frame in the direction of the plow blade 114. At or near the distal end of the lift arm 106 is at least one chain (not shown) which connects the lift bar to the plow blade 114. The lift arm 106 and at least one chain maintain the plow blade 114 and/or plow frame 112 in a generally horizontal orientation during operation of the plow blade assembly 116. In certain embodiments, the lift arm and at least one chain maintain the plow blade 114 and/or plow frame 112 in a generally horizontal orientation even if the plow blade 114 is pivoted or angled relative to the frame member 132. Accordingly, the lift bar 110 functions to vertically raise or lower the plow frame 112 and plow blade 114.

Figure 2:
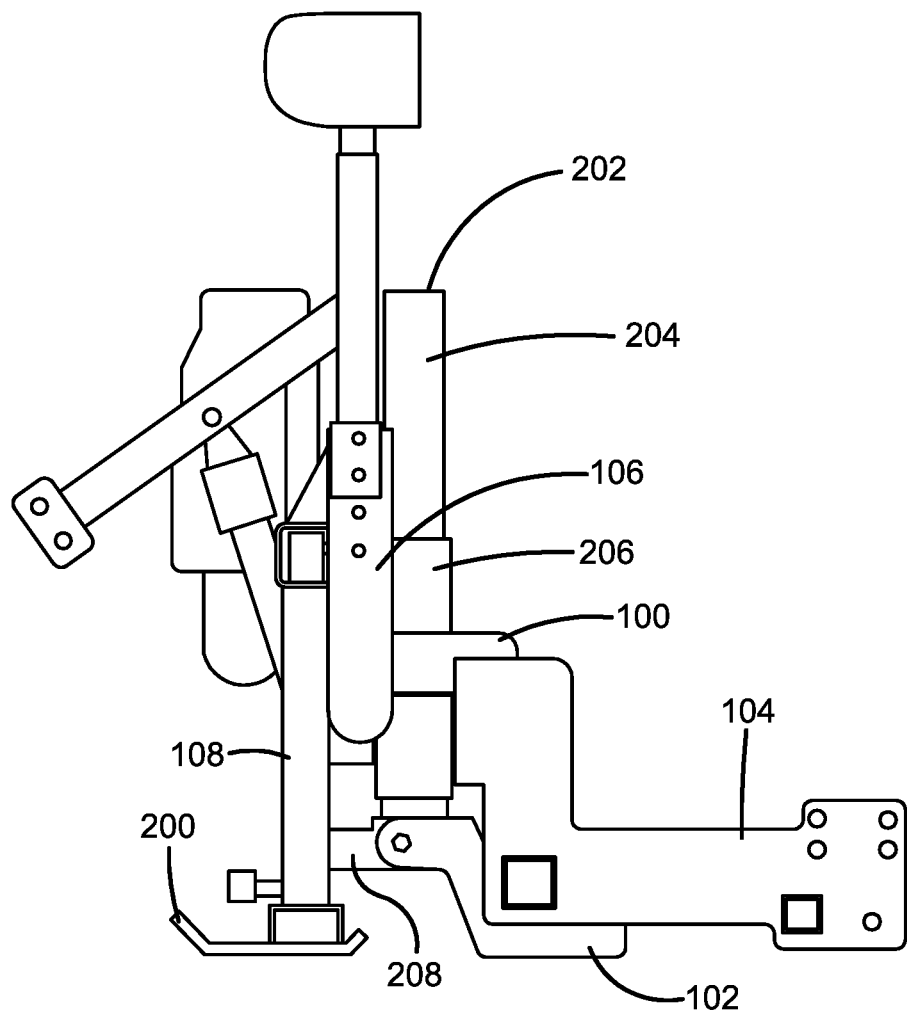
FIG. 2 is a side view of a lift frame of a plow mounting apparatus.

In certain embodiments, the plow mounting apparatus 120 is integrated within the plow blade assembly 116. With reference to FIGS. 1 and 2, an embodiment of the plow mounting apparatus 120 is shown attached to a vehicle mounting frame 104. The plow mounting apparatus includes a hydraulic cylinder 108. The bottom portion of the hydraulic cylinder 108 is attached to a foot member 200 and the top portion of the hydraulic cylinder 108 is attached to the lift frame 106.

Figure 7:
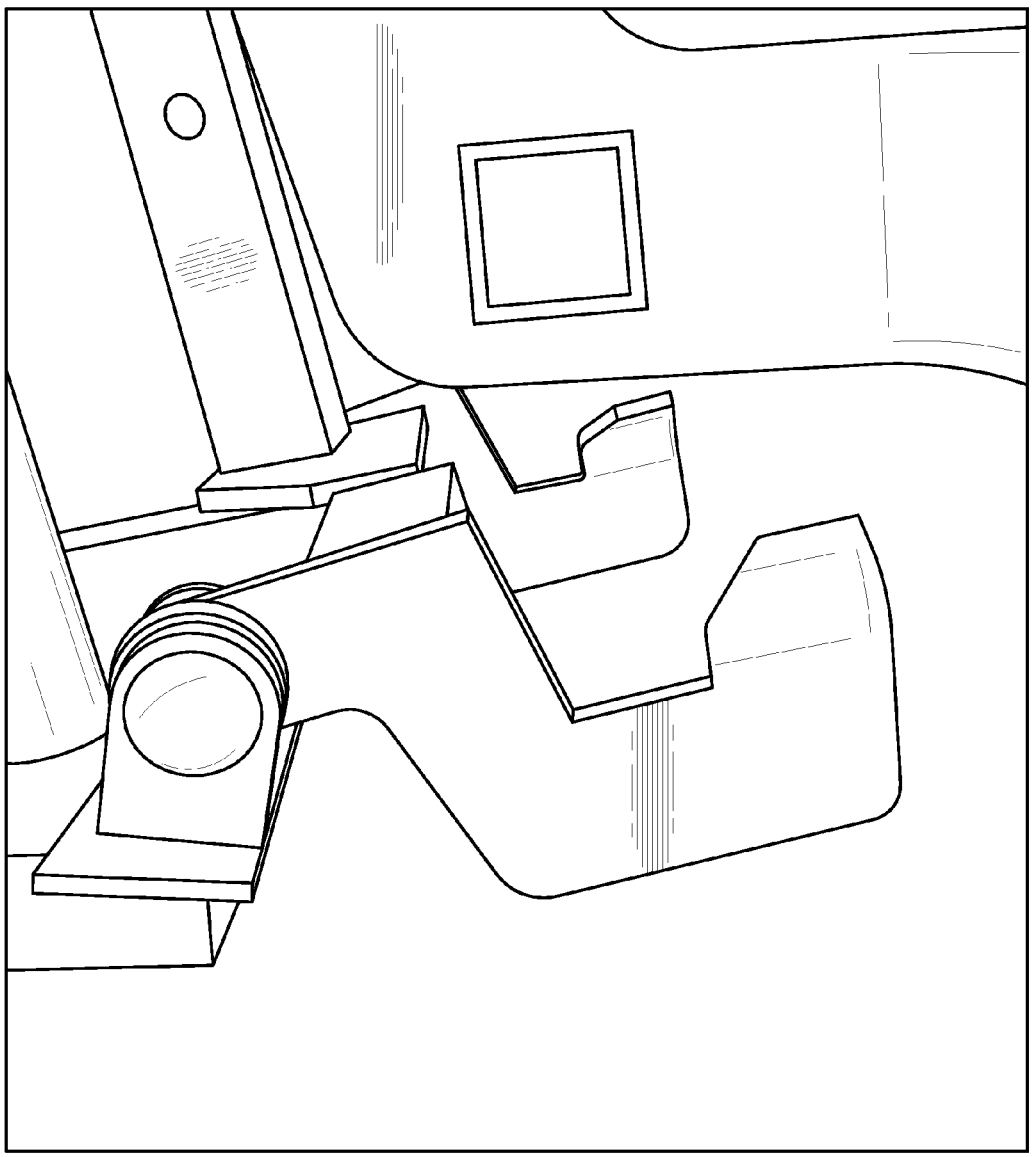
FIG. 7 is a side view of an exemplary embodiment of the plow mounting apparatus showing the clevis frame and lower hooks in a rotated position along the clevis frame axis.

The plow mounting apparatus 120 also includes a clevis frame 118 pivotally mounted to the rear portion of the plow frame 112. In certain embodiments, the clevis frame 118 is attached to the rear portion of the plow frame 112 through a first pivotal mount 120 positioned at a first side and a second pivotal mount positioned at a second side at the rear portion of the plow frame 112. The clevis frame 118 includes a horizontal cross member between the first pivotal mount and the second pivotal mount. The horizontal cross member of the clevis frame 118 is pivotable along the axis of the first and second pivotal mounts relative to the plow frame 112 as shown in FIG. 7. Any type of fastener within the sound judgment of a person of ordinary skill in the art may be utilized to pivotally connect the clevis frame 118 to the rear portion of the plow frame 112. The clevis frame 118 may further include a pair of lower hooks 102 which are positioned perpendicular to the horizontal cross member of the clevis frame and which extend toward the vehicle mounting frame 104. In certain embodiments, the lower hooks 102 are attached to an outer first end and an outer second end of the horizontal member of the clevis frame 118. In other embodiments, the lower hooks 102 are respectively attached to the first pivotal mount and the second pivotal mount on the rear portion of the plow frame 112 and are also attached to the outer first end and the outer second end of the horizontal cross member of the clevis frame 118.

The plow mounting apparatus also includes a pair of upper hooks 100. In certain embodiments, the pair of upper hooks is attached to the lift frame 106. The lift frame 106 includes a first vertical member and a second vertical member spaced apart by at least one horizontal member. In certain embodiments, the first vertical member and the second vertical member of the lift frame 106 are spaced apart by a first horizontal cross member, a second horizontal cross member and a third horizontal cross member. In further embodiments, the first horizontal cross member may be positioned at the top portion of the lift frame, the third horizontal cross member may be positioned at the bottom portion of the lift frame and the second horizontal cross member may be positioned below the first horizontal cross member and above the third horizontal cross member. In certain embodiments, the pair of upper hooks 100 is attached to one of the horizontal cross members of the lift frame 106. In further embodiments, the pair of upper hooks 100 may be attached to the third horizontal cross member of the lift frame. The pair of upper hooks 100 may be positioned perpendicular to the third horizontal cross member of the lift frame 106 and extend towards the vehicle mounting frame 104. In still further embodiments, the pair of upper hooks 100 may be pivotally attached to one of the horizontal members of the lift frame 106.

The pair of upper hooks 100 and the pair of lower hooks 102 are designed to respectively engage a first or upper cross member 500 and a second or lower cross member 502 on a vehicle mounting frame 104. The upper and lower cross members of the vehicle mounting frame 104 are attached to a first vertical support member 504 and a second vertical support member 506 at their respective ends. The first and second vertical support members of the vehicle mounting frame 104 include a bottom portion which is angled to laterally extend toward the mounting end of a vehicle. Thus, the vehicle mounting frame also includes a first and second lateral extension. This lateral extension of the first and second vertical support members may, in certain embodiments, be angled approximately 90 degrees relative to the first and second vertical support members and may be substantially perpendicular to the first and second cross members of the vehicle mounting frame 104. The rear portion of the vehicle mounting frame may include a horizontal member positioned between the first and second lateral extensions. The rear portion of the vehicle mounting frame is attached to the mounting end of a vehicle.

In certain embodiments, the plow mounting apparatus also includes a vertical pull structure 202. The vertical pull structure 202 includes an outer vertical sleeve and an inner vertical member which is slidingly engageable with the outer vertical sleeve. The outer vertical sleeve may include a side portion towards its top end which is attached to at least one of the horizontal cross members on the back or rear side of the lift frame 106. The bottom end of the inner vertical member is attached to the top portion of the horizontal cross member of the clevis frame 118. The outer vertical sleeve and the inner vertical member may be designed in any shape within the sound judgment of a person of skill in the art to be slidingly engageable with each other. In certain embodiments, the outer vertical sleeve may be cylindrical in shape with a hollow interior to constitute a tubular structure. In such embodiments, the inner vertical member may also be cylindrical in shape and have a diameter which is less than that of the outer vertical or cylindrical sleeve so that it may fit within, and be slidingly engageable with, the outer vertical sleeve. In such embodiments, the inner vertical member is referred to as the inner cylinder 204 and the outer vertical sleeve is referred to as the outer sleeve 206 as referenced below.

Figure 6:
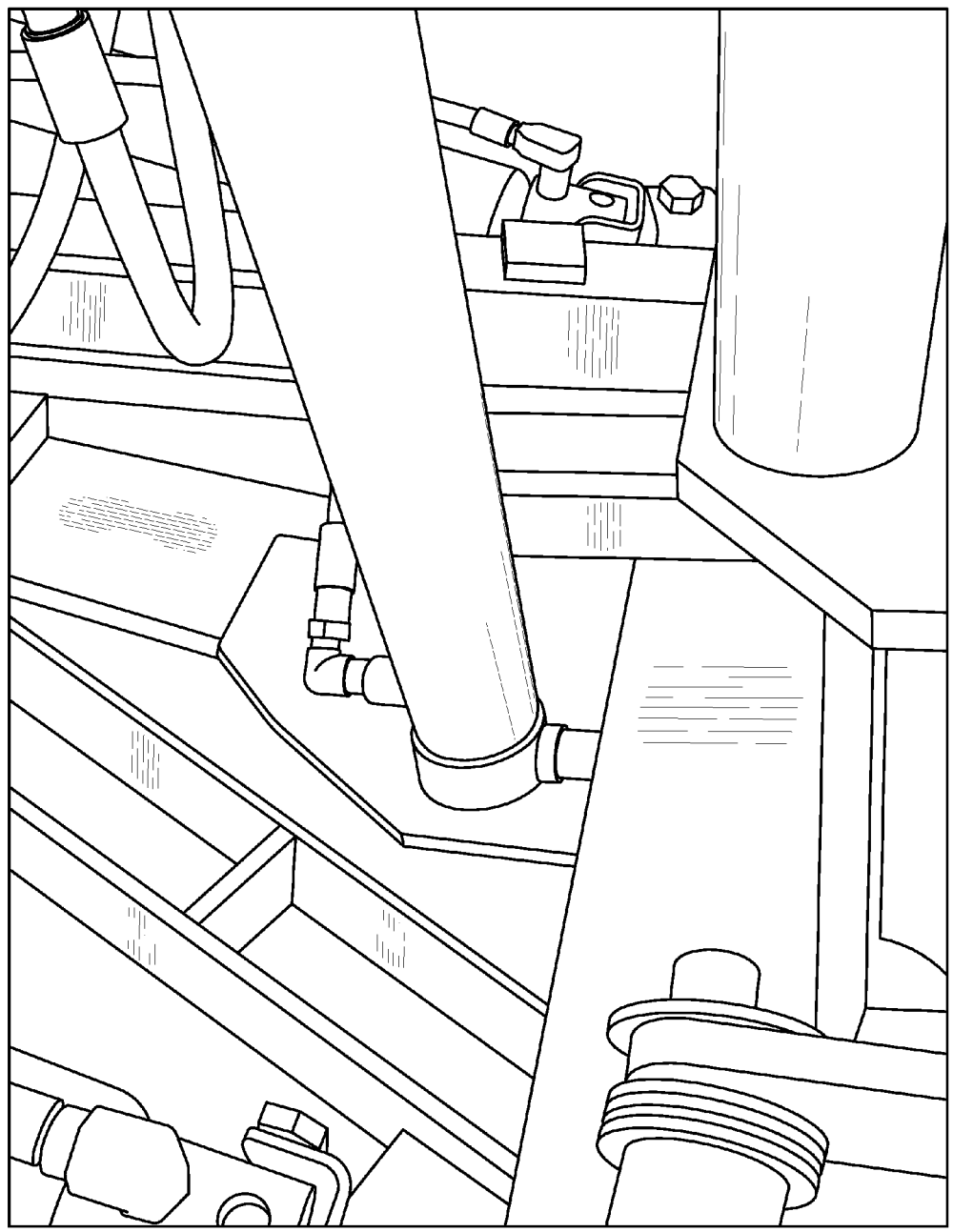
FIG. 6 is an overhead perspective view of an embodiment of the plow mounting apparatus showing the foot member and hydraulic cylinder positioned within the interior of the plow frame.
Figure 8:
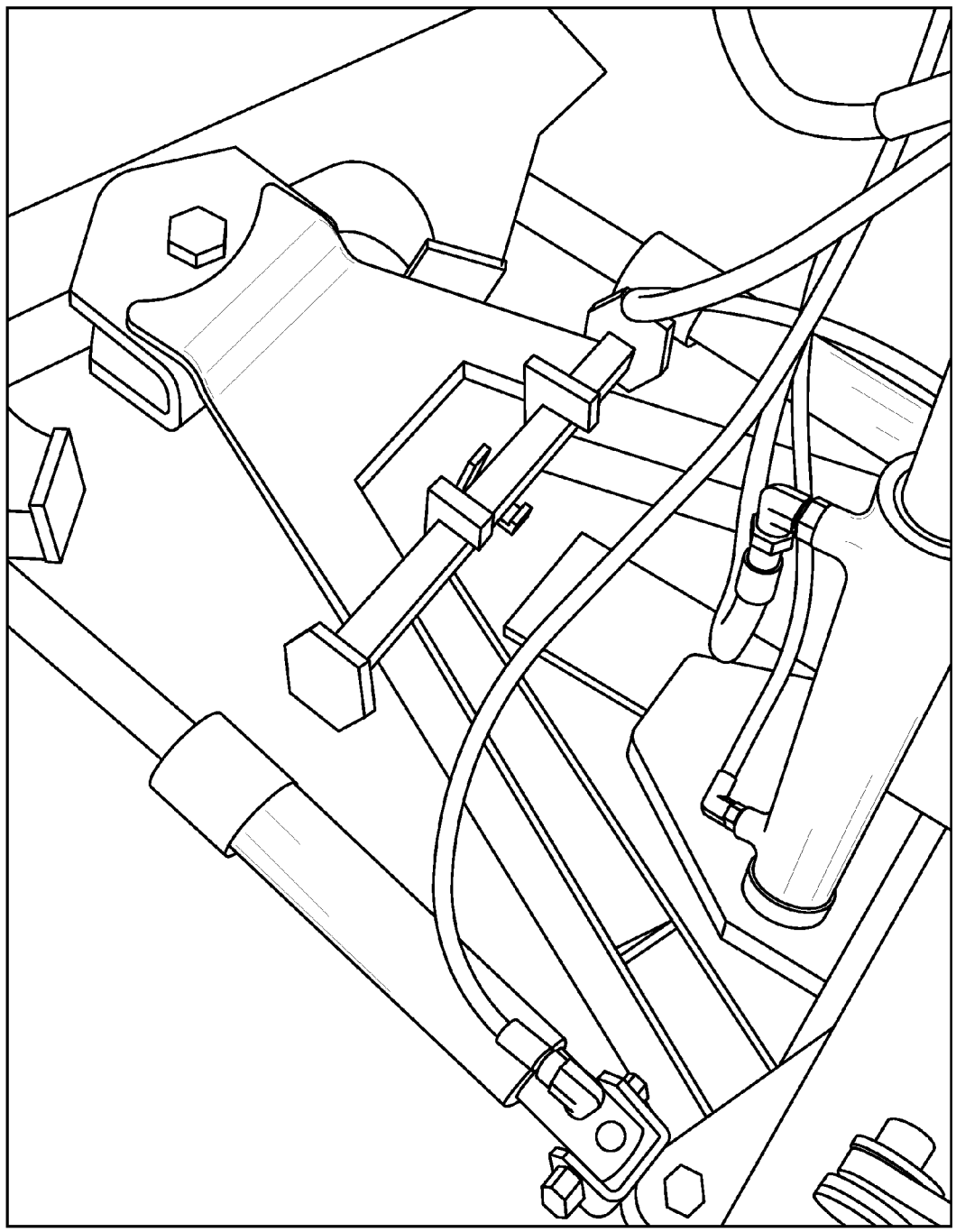
FIG. 8 is an overhead view of an exemplary embodiment of the plow mounting apparatus showing the foot member and hydraulic cylinder positioned within the interior of the plow frame.

In certain embodiments, the plow mounting apparatus also includes a foot member-clevis frame connecting member 400. The foot member-clevis frame connecting member 400 includes a first end which is connected to a foot member plate, which is also connected to the hydraulic cylinder 108. In certain embodiments, the foot member plate, the hydraulic cylinder 108 and the first end of the foot member-clevis frame connecting member 400 are positioned within the interior portion of the plow frame 112 in front of a rear cross member of the plow frame 112, as shown in FIGS. 6 and 8. The foot member-clevis frame connecting member 400 includes a second end which is connected to the horizontal cross member of the clevis frame. In such embodiments, the second end of the foot member-clevis frame connecting member 400 extends over the top portion of the rear cross member of the plow frame to the clevis frame. In certain embodiments, the foot member-clevis frame connecting member 400 may be connected to the top portion of the horizontal cross member 208 of the clevis frame 118, while in other embodiments, it may be connected to the front portion of the horizontal cross member 208 of the clevis frame 118, as shown in FIG. 7. In further embodiments, the foot member-clevis frame connecting member 400 may be angled such that it extends vertically upward at an angle relative to the foot member plate and is further angled to horizontally extend towards the clevis frame 118.

The plow mounting apparatus may be used with any type of plow frame within the sound judgment of a person of ordinary skill in the art. In certain embodiments, the plow frame 112 utilized with the plow mounting apparatus is an "A" shaped frame, or A-frame, which connects the lift frame 106 to the plow blade 114 and assists in raising, lowering, and controlling the operation of the plow blade 114.

The operation of the plow mounting apparatus within the plow blade assembly will now be described. The plow mounting apparatus may function to operate between a closed position and an open position. When in the closed position, the plow mounting apparatus is attached to or engaged with a vehicle mounting frame of an associated vehicle. When in the open position, the plow mounting apparatus is disengaged from the vehicle mounting frame or associated vehicle and is free standing.

When in the closed position, the components of the plow mounting apparatus may be in the following positions. First, the hydraulic cylinder 108 is in a retracted or raised position, resulting in the foot member being positioned off of the ground surface. Second, the upper hooks 100 and lower hooks 102 are positioned at a pre-defined vertical distance between each other to engage the first and second cross members of the vehicle mounting frame. Third, the vertical pull structure 202 is oriented such that the inner vertical member is fully engaged within the outer vertical sleeve.

When in the open position, the components of the plow mounting apparatus may be in the following positions. First, the hydraulic cylinder 108 is in a fully extended position which results in the foot member being positioned on the ground surface to hold the plow blade assembly off of the ground. Second, the upper hooks 100 and lower hooks 102 are positioned at a pre-defined vertical distance between each other (greater than the vertical distance of the closed position) which allows for disengagement from the first and second cross members of the vehicle mounting frame. Third, the vertical pull structure 202 is oriented such that the inner vertical member is partially disengaged from the interior of the outer vertical sleeve. Accordingly, the upper and lower hooks 100 and 102 may be opened and closed through normal operation of the hydraulic cylinder 108.

With reference to FIG. 2, the lower portion of the hydraulic cylinder 108 may be pivotally connected to the foot member 200 which supports the plow blade assembly 116 when it is not installed on an associated vehicle. The foot member 200 may consist of a foot member plate which is pivotal with respect to the hydraulic cylinder 108. The foot member 200 is connected to the clevis frame cross member 208 via the foot member-clevis frame connecting member 400 as shown in FIG. 6. When the plow blade assembly 116 is in the closed position, the foot member 200 is raised off of the ground. When transitioning from the closed position to an open position, the hydraulic cylinder 108 extends, thereby causing the foot member 200 to make contact with the ground. The hydraulic cylinder 108 can continue to extend, thereby causing the lift frame 106 to rise vertically, resulting in the opening of the distance between the upper and lower hooks, 100 and 102 respectively, to disengage the vehicle mounting frame. In the open position, the vehicle mounting frame 104 may be engaged to, or removed from, the plow blade assembly 116 with ease. Typically, this can be accomplished by driving the associated vehicle towards the plow blade assembly 116 for installation, and driving the vehicle away from the plow blade assembly 116 for removal.

Also depicted in FIG. 2 is the vertical pull 202, which may, in certain embodiments include an inner cylinder 204 and an outer sleeve 206. The vertical pull 202 functions to stabilize the plow blade assembly 116, as well as to prevent lateral movement of the plow blade assembly and rotation about the vertical axis.

According to one embodiment, the inner cylinder 204 of the vertical pull 202 is permanently connected between the lower hooks 102 of the clevis frame 118, and the outer sleeve 206 is permanently connected between the upper hooks 100 of the lift frame 106. According to one embodiment, the inner cylinder 204 is welded to the clevis frame 118 between the lower hooks 102 and the outer sleeve 206 is welded to a cross member on the lift frame 106. The inner cylinder 204 can be solid or tubular with a hollow interior. In one embodiment, the inner cylinder 204 is made of solid steel. The outer sleeve 206 can be a hollow tube with openings at both ends with a sufficiently sized inner diameter to allow the inner cylinder 204 to move within the outer sleeve 206.

The inner cylinder 204 can be partially enclosed within the outer sleeve 206 and sized so that the length of the inner cylinder 204 extends beyond both openings of the outer sleeve 206 when the plow blade assembly 116 is in either the open or closed position. When the plow blade assembly 116 is in the closed position, the outer sleeve 206 is positioned near the base of the inner cylinder 204. When transitioning between a closed and an open position, the lift frame 106 extends upward and the inner cylinder 204 moves in a downward direction. Extending the lift frame 106 in an upward direction causes the outer sleeve 206 to also move in an upward direction, opposite the direction of the inner cylinder 204. Once an open position is achieved, the outer sleeve 206 is situated near the topmost portion of the inner cylinder 204, as shown in FIG. 3.

Figure 3A:
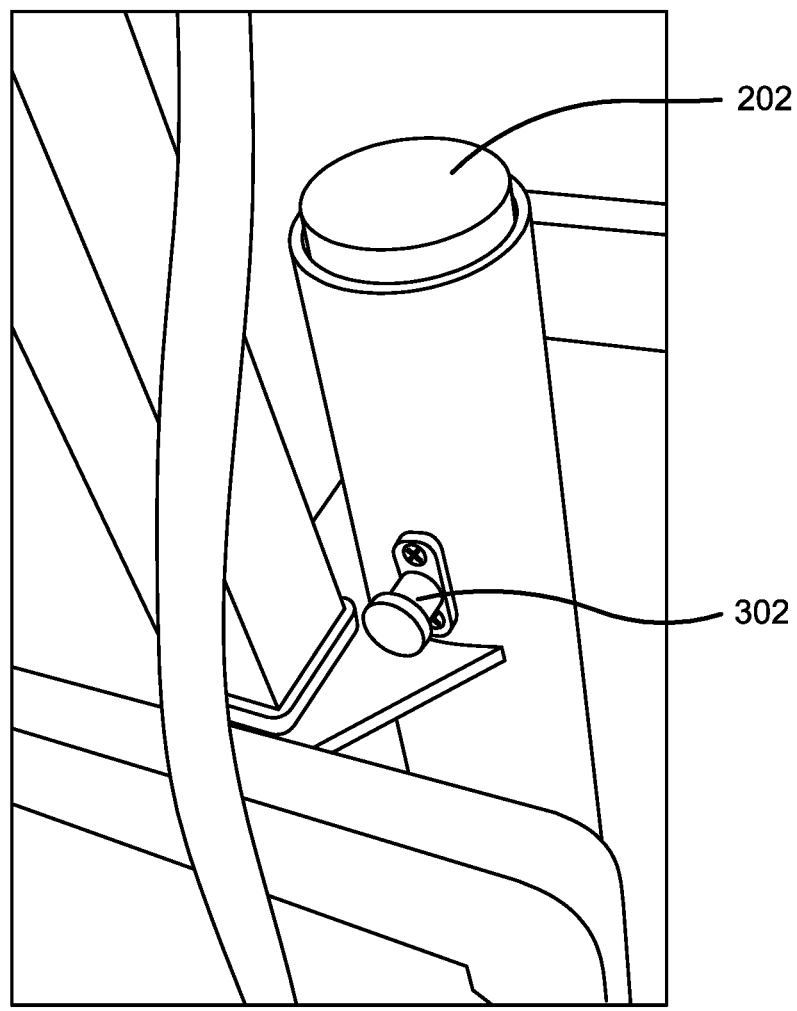
FIGS. 3A and 3B are perspective views of a vertical pull structure.
Figure 3B:
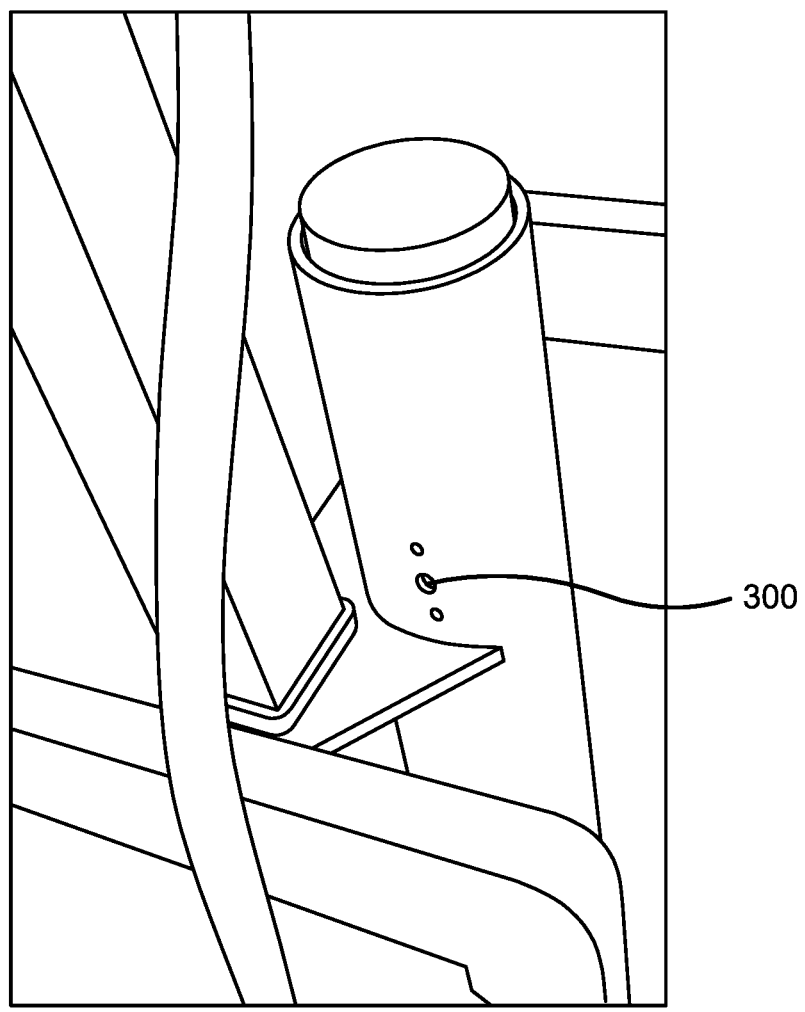

With reference to FIGS. 3A and 3B, the vertical pull 202 is shown in the open position within the plow blade assembly 116. According to one embodiment, the wall of the outer sleeve 206 has an aperture 300 which may overlap a corresponding aperture (not shown) within the inner cylinder 204, as shown in FIG. 3B. When the vertical pull 202 is in the closed position, the aperture 300 in the outer sleeve 206 can be aligned with the aperture in the inner cylinder 204. According to this embodiment, an automatic locking pin 302 can pass through the aperture 300 and into the aperture of the inner cylinder, thereby locking the vertical pull 202 in the closed position. The automatic locking pin 302 can include a biasing device (e.g., a spring) that pushes the pin in place when the aperture in the inner cylinder 204 is aligned with the aperture 300 in the outer sleeve 206. According to this embodiment, the user can manually release the automatic locking pin 302 prior to opening the plow blade assembly 116. According to other embodiments, the locking mechanism may comprise a manual locking pin, such as a cotter pin or a detent pin. Other suitable locking mechanisms may be chosen according to the sound judgment of a person of ordinary skill in the art. In the event that the hydraulic cylinder 108 fails to operate properly, the locked vertical pull 202 may provide a mechanical backup to the hydraulic cylinder 108, thereby allowing the plow blade assembly 116 to remain in the closed position until the user desires to open the plow blade assembly 116.

Figure 4:
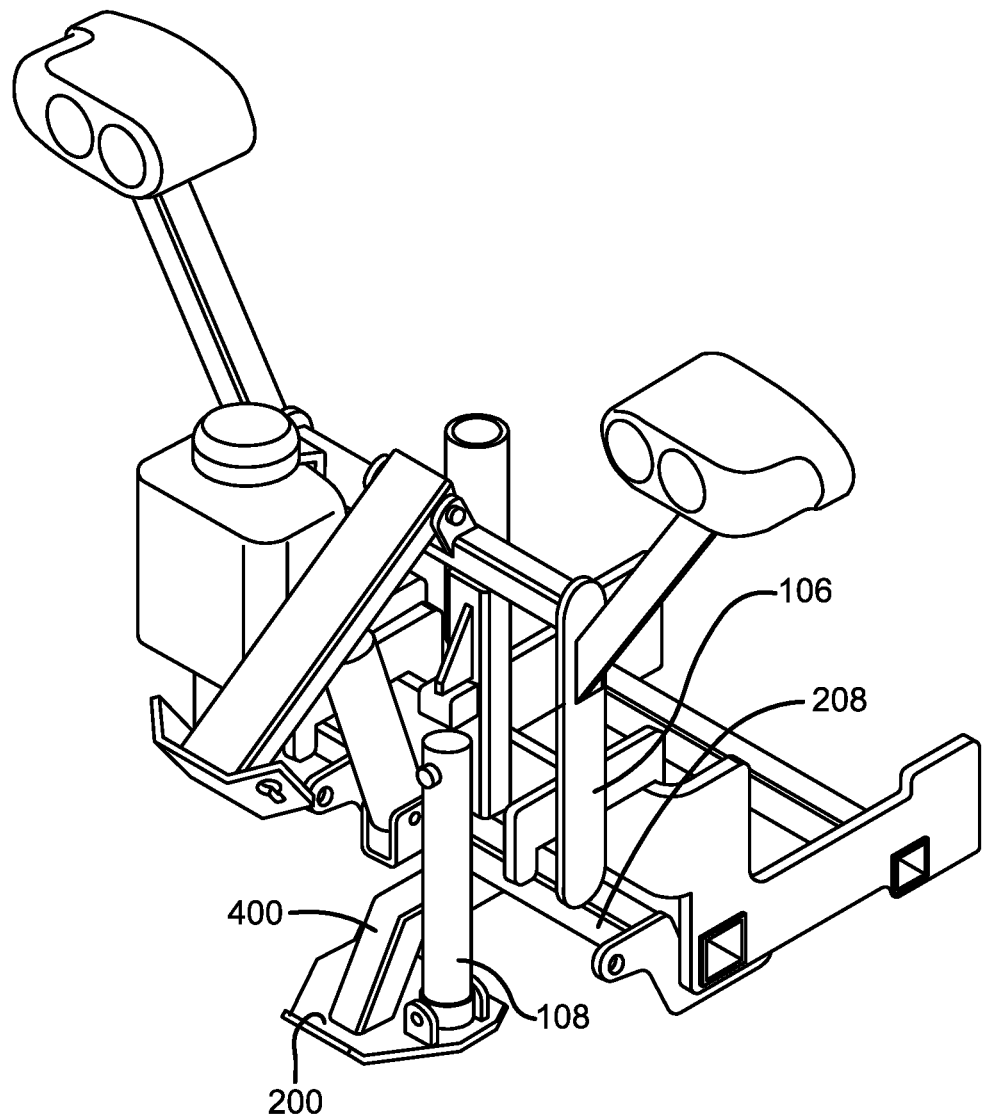
FIG. 4 is a perspective view of an embodiment of the plow mounting apparatus.

With reference to FIGS. 2 and 4, in one embodiment the foot member 200 and a first end of the foot member-clevis frame connecting member 400 are welded together, and a second end of the foot member-clevis frame connecting member 400 and the clevis frame 118 are welded together. The shape of both the foot member-clevis frame connecting member 400 and the foot member 200 may allow for angular movement of the foot member 200, hydraulic cylinder 108, clevis frame 118, lift frame 106 and vertical pull structure 202 as a single unit along the clevis frame pivot axis when the plow mounting assembly is operated to move from the open position to the closed position, and vice versa, as shown in FIG. 7. The size and shape of the foot member-clevis frame connecting member may be of any design and/or configuration within the sound judgment of a person of ordinary skill in the art. This feature may allow the plow blade assembly 116 to maintain stability during the mounting and un-mounting process. It may also keep the lift frame 106 in proper alignment while the hydraulic cylinder 108 transitions the plow blade assembly 116 between the open and closed positions.

Figure 5:
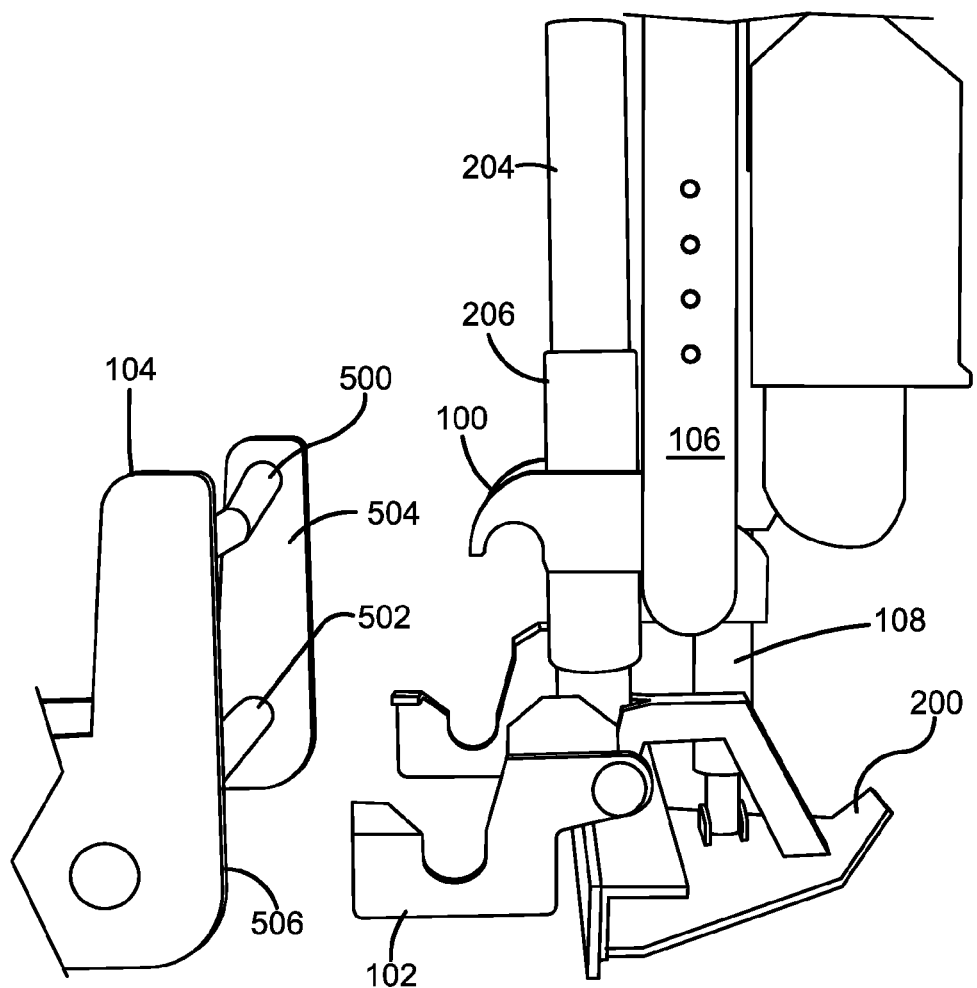
FIG. 5 is a side view of an embodiment of the plow mounting apparatus.

With reference to FIG. 5, the vehicle mounting frame 104 is shown separated from the lift frame 106. According to one embodiment, the vehicle mounting frame includes an upper cross member 500 and a lower cross member 502 that are generally parallel to each other. Each of the upper and lower cross members 500 and 502 can be permanently attached at a first end to a first vertical support member 504 and at a second end to a second vertical support member 506. The lower cross member 502 can comprise a metal cylindrical structure that can be straight, with no bends in the length of the cylindrical structure. The upper cross member 500 can also comprise a metal cylindrical structure. In certain embodiments, the upper cross member 500 may be straight with no bends in the length of the cylindrical structure while in other embodiments, the upper cross member 500 can have at least one bend within the length of the cylindrical structure. According to one embodiment, the upper cross member 500 has two bends, making the profile of the upper cross member 500 resemble a flattened "U" shape. According to another embodiment, the upper cross member 500 can have an "M" shaped profile. According to one embodiment, the upper and lower cross members 500 and 502 are made of steel. The upper and lower cross members 500 and 502, and the first and second vertical support members 504 and 506, together form a generally rectilinear shaped frame of the vehicle mounting frame 104.

With further reference to FIG. 5, the lift frame 106 and clevis frame 118 are shown separate from the vehicle mounting frame 104 in the closed position. In order to install the plow mounting apparatus on the vehicle mounting frame 104, the hydraulic cylinder 108 is activated, causing it to extend. The foot member 200 contacts the ground or other surface, while the hydraulic cylinder 108 drives the lift frame 106 and the outer sleeve 206 of the vertical pull structure 202 upwards. The inner cylinder 204 of the vertical pull structure 202 and the lower hooks 102 are simultaneously pushed downwards by the hydraulic cylinder 108 on the foot member 200. This is accomplished by the inner cylinder 204 and the lower hooks being attached to the foot member 200 through the clevis frame 118 and the foot member-clevis frame connecting member 400. Accordingly, the upper hooks 100 and the lower hooks 102 are vertically extended to a length greater than the vertical length between the upper and lower cross members 500 and 502 of the vehicle mounting frame 104. This allows the vehicle mounting frame 104 to clear the vertical length between the upper and lower hooks 100 and 102 when the vehicle is driven towards the plow assembly. Once the lift frame 106 has risen a suitable distance such that the upper and lower hooks 100 and 102 are able to clear the upper and lower cross members 500 and 502 of the vehicle mounting frame 104, the plow mounting apparatus is in the open position and can be installed on the associated vehicle mounting frame 104. The associated vehicle is driven towards the plow assembly such that the upper cross member 500 is aligned with the upper hooks 100 and the lower cross member 502 is aligned with the lower hooks 102. Once so aligned, the hydraulic cylinder 108 can be reversed or retracted to lower the lift frame 206 and the upper hooks 100 so that the upper hooks rest on the upper cross member, and to raise the lower hooks 102 to engage the lower cross member 502, thereby bringing the plow mounting apparatus back to the closed position. Once returned to the closed position, the upper hooks 100 lock around the outer diameter of the upper cross member 500 and the lower hooks 102 lock around the outer diameter of the lower cross member 502. As shown in FIGS. 3A and 3B, as well as described above, in this closed position the vertical pull structure 202 can be locked into place via the self-locking pin 302, or by way of any other locking device within the sound judgment of a person of ordinary skill in the art.

The above referenced associated vehicle may be any of a number of suitable vehicles including, but not limited to, a pick-up truck, a skid loader, a front end loader, a dump truck, a rail car, or a snowcat.

In certain embodiments, an auxiliary lighting system or light mounting apparatus is designed for use with a snow plow assembly. Such an auxiliary lighting system or light mounting apparatus may be used with any type of material handling assembly or plow. The auxiliary lighting system or light mounting apparatus is designed to be adjustable such that a user can adjust the height and/or angle of illumination of the headlights of the lighting system relative to the road or ground surface based, on the height of the plow assembly and/or vehicle.

Figure 11:
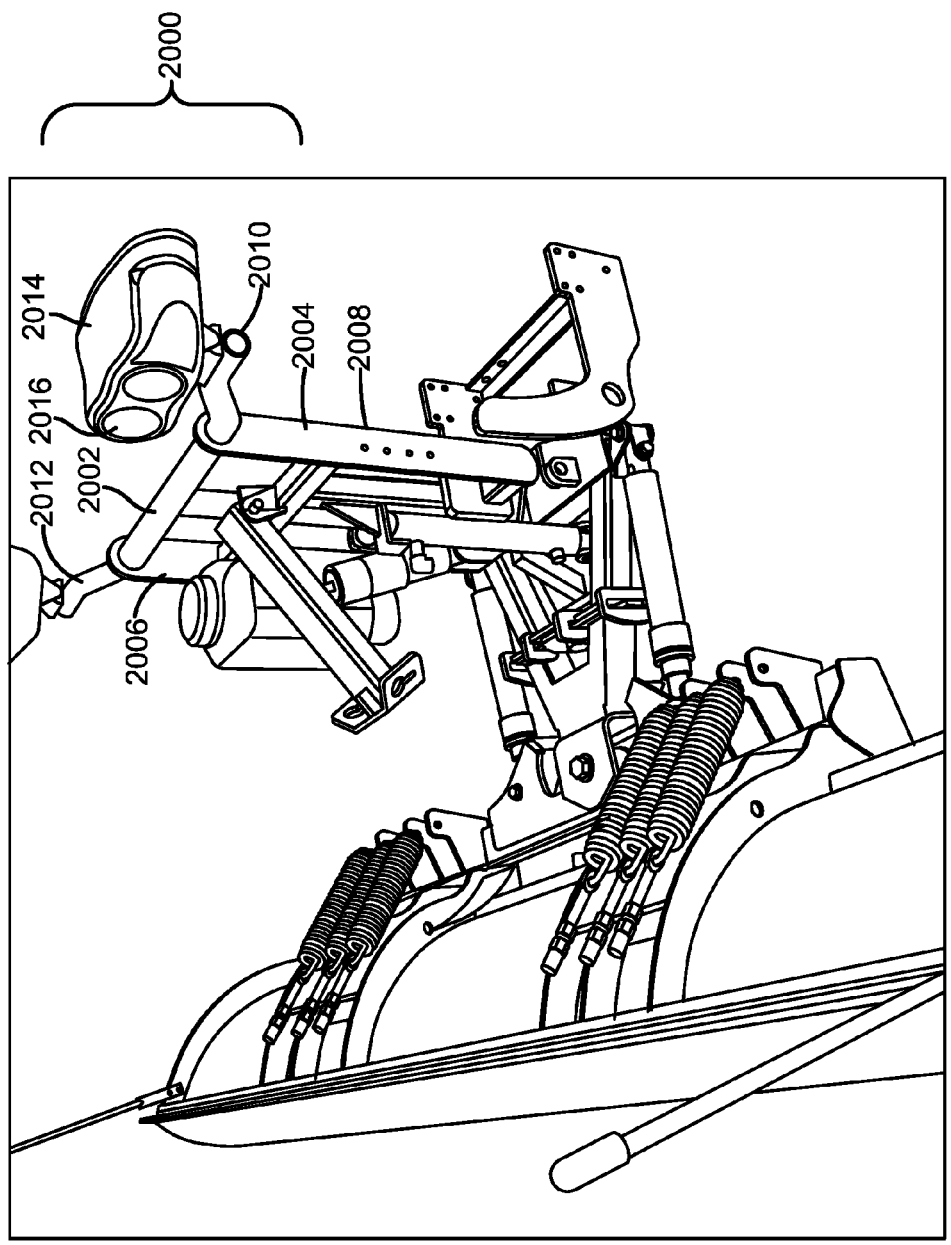
FIG. 11 is a perspective view of a snow plow frame with an auxiliary lighting system attached.

An embodiment of an auxiliary lighting system or light mounting apparatus 200, according to the present disclosure, is illustrated by FIG. 11. The auxiliary lighting system or light mounting apparatus 2000 is attached to a snow plow assembly. In certain embodiments, the auxiliary lighting system or light mounting apparatus 200 includes a cross member 2002 that is attached between a first side member 2004 and a second side member 2006 of a lift frame 2008 of the snow plow assembly. In certain embodiments, the cross member 2002 may be the upper most cross member of the lift frame 2008. The cross member may be manufactured into any shape within the sound judgment of a person of suitable skill in the art. In certain embodiments, the cross member 2002 may have a cylindrical or tubular structure. The cross member 2002 may be permanently attached to the first side member 2004 and the second side member 2006 of the lift frame 2008. Extending from a first end of the cross member 2002 is a first horn 2010, and extending from a second end of the cross member 2002 is a second horn 2012.

In certain embodiments, the first and second horns 2010 and 2012 have a bent cylindrical or tubular shape, although the horns may have any shape within the sound judgment of a person of suitable skill in the art. The horns 2010 and 2012 may be hollow and have ends that can be open-ended or capped. The horns 2010 and 2012 are positioned at the outer ends of the first side member 2004 and the second side member 2006, whereas the cross member 2002 is positioned between the inner ends of the first side member 2004 and the second side member 2006. The inner ends of the first and second horns 2010 and 2012 have a diameter which is sized to fit within the outer ends of cross member 2002. Accordingly, the outer ends of the cross member 2002 have a diameter that is larger than the diameter of the inner ends of the first and second horns 2010 and 2012, respectively. According to one embodiment, the first and second horns 2010 and 2012 are sized and shaped to be removably connectable to the cross member 2002. The auxiliary lighting system or light mounting assembly 2000 also includes at least one auxiliary light housing 2014 which contains at least one auxiliary light 2016 connected to either the first horn 2010, the second horn 2012, or both the first horn 2010 and the second horn 2012.

Figure 12:
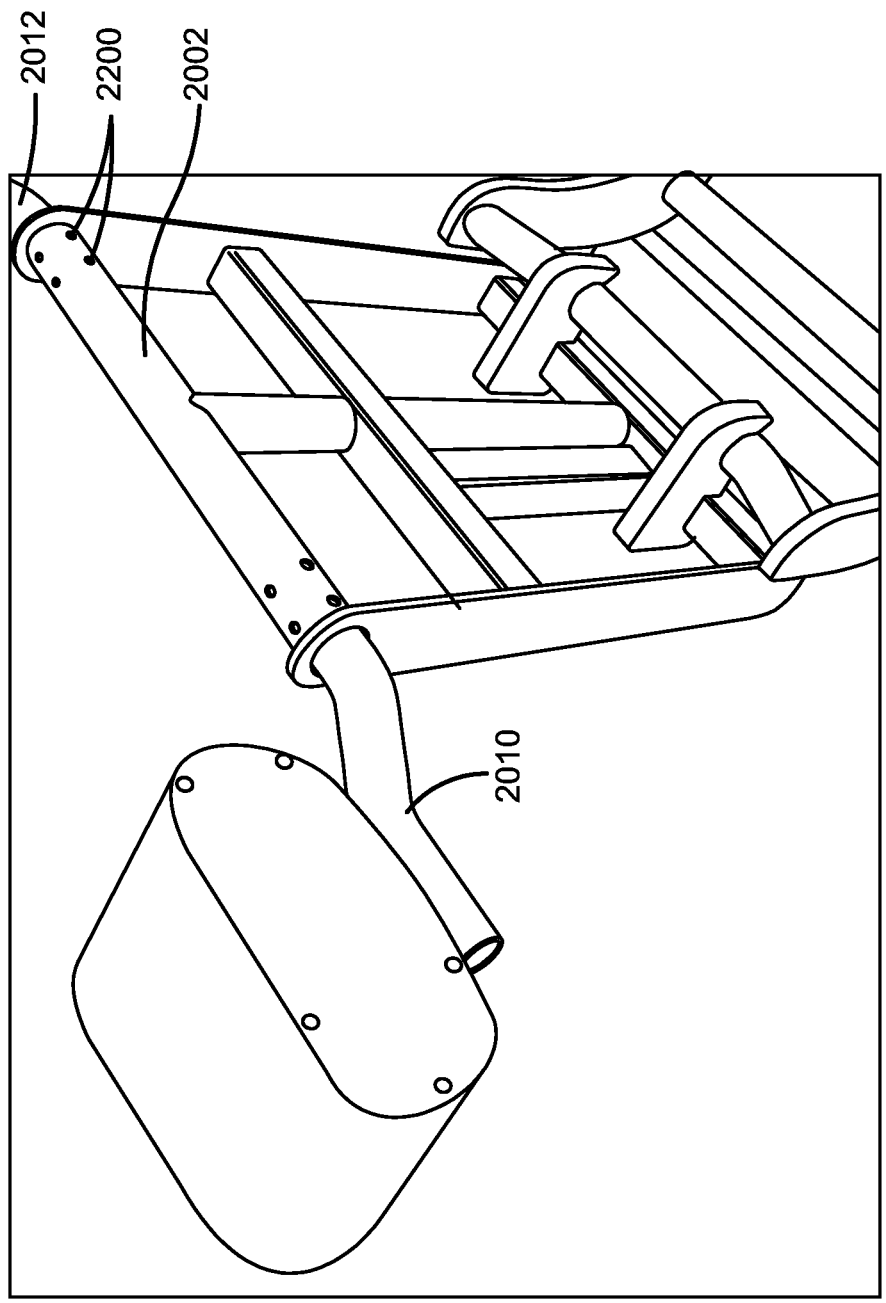
FIG. 12 is a rear view of an auxiliary lighting system.

With reference to FIG. 12, the cross member 2002 can have at least one aperture 2200 positioned at various points along the circumference of the cross member 2002 at the first and/or second end of the cross member 2002. The first horn 2010 and second horn 2012 also include at least one aperture (not shown). At least one aperture on the first horn 2010 and at least one aperture on the second horn 2012 may be lined up so as to overlap at least one aperture 2200 on the cross member 2002, allowing the horns 2010 and 2012 to be adjusted accordingly with respect to the cross member 2002. The horns 2010 and 2012 may be secured to the cross member 2002 by inserting a pin or any other type of fastener, as identified within the sound judgment of a person of ordinary skill in the art, through the overlapping apertures of the horns 2010 and 2012 and the cross member 2002. The cross member 2002 may include any number of apertures, located at any position along the circumference of the cross member 2002, as is deemed necessary within the sound judgment of a person of suitable skill in the art. Accordingly, the exact placement and number of apertures 2200 can be chosen by one of skill in the art, and may vary depending upon the desired position or angle of the first and second horns 2010 and 2012 with respect to the cross member 2002, as well as the position or angle of the associated auxiliary light housings 2014 relative to the cross member 2002 and/or ground surface. According to one embodiment, the cross member 2002 may have four pairs of apertures 2200 at each end, spaced at 90 degree intervals about the circumference of the cross member 2002.

Figure 13:
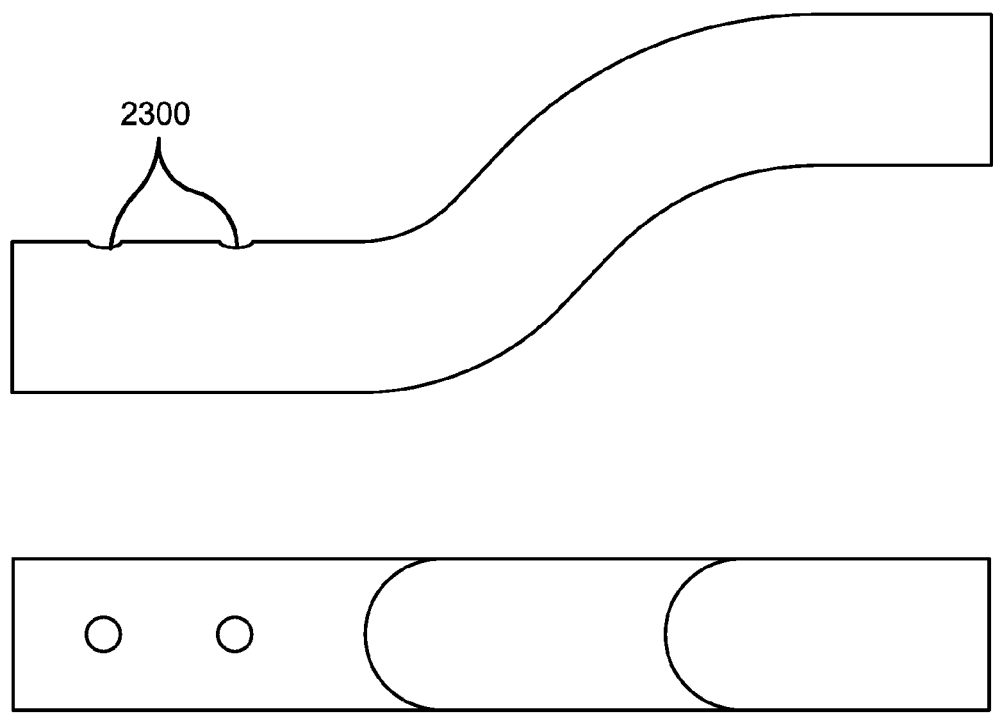
FIG. 13 is a side view and an overhead view of the horns of an auxiliary lighting system.

With reference to FIGS. 12 and 13, and as mentioned above, each of the first horn 2010 and second horn 2012 have at least one aperture 2300 which corresponds to or overlaps the apertures 2200 within the cross member 2002. The apertures 2300 are aligned with the apertures 2200 in the cross tube member 2002 and fastened in place. The first and second horns 2010 and 2012 can be fastened by any means including, but not limited to, locking pins, cotter pins, self-locking pins, bolts, screws or any other non-permanent fasteners identified within the sound judgment of a person of suitable skill in the art. By removing the fastening mechanism, a user may rotate the first horn 2010 and/or second horn 2012 with respect to the cross member 2002, thereby changing the angle of illumination of the associated auxiliary light housing 2014 and the at least one auxiliary light 2016 contained therein. This allows the user to adjust the auxiliary light system or light mounting apparatus 2000 relative to the height of an associated vehicle and/or plow assembly to maintain compliance with traffic and vehicle regulations, without compromising the visual abilities of the driver.

Figure 14:
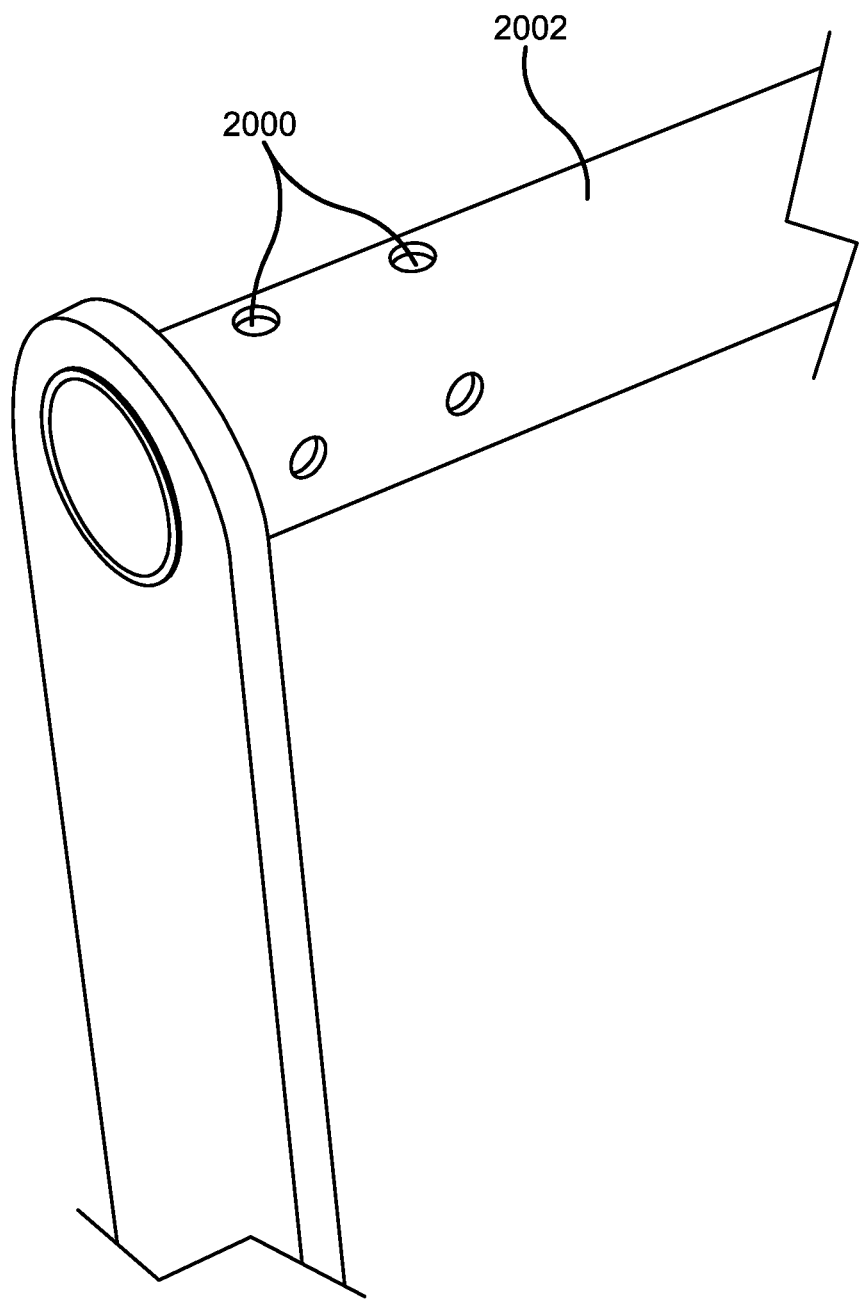
FIG. 14 is a close up view of one end of a cross tube member of an auxiliary lighting system.

With reference to FIG. 14, a close up view of one end of the cross member 2002 is shown having two pairs of apertures 2200 visible. In order to properly utilize the auxiliary lighting system or light mounting apparatus 2000, the plow frame first can be mounted on the front of an associated vehicle. The mounting of the plow frame can be accomplished by any of the means previously mentioned by the present disclosure. Once the plow frame is mounted and the auxiliary light system 2000 is electrically connected and powered, the user can measure the angle of the auxiliary light(s) 2016 relative to the height of the associated vehicle. If the angle of the auxiliary light(s) 2016 properly falls within the ranges prescribed by local regulations, the user can insert the chosen fastening means through the apertures 2200 in the cross member 2002 and into the horn apertures 2300 of the first and second horns 2010 and 2012, thereby locking the angle of the auxiliary light(s) 2016 relative to the ground surface.

According to one embodiment, an alternative method allows the user to adjust the angle of the auxiliary light(s) 2016 relative to the ground surface by trial and error to obtain a proper adjustment that allows the user to see the road ahead. If the measured angle of the auxiliary light(s) 2016 is not within the proper ranges as prescribed by local regulations, the user can rotate the first and second horns 2010 and 2012 so as to raise or lower the angle of the auxiliary light(s) 2016 relative to the height of the associated vehicle. The user can then re-measure the angle of the auxiliary light(s) 2016 and continue to adjust them until the measurements fall within the prescribed ranges. Once the angle of the auxiliary light(s) have been measured so as to fall within the proper ranges, the user is able to insert the chosen fastening means through the apertures 2200 in the cross member 2002 and into the horn apertures 2300 of the first and second horns 2010 and 2012, thereby locking the angle of illumination of the auxiliary light(s) 2016.

According to another embodiment of the auxiliary lighting system or light mounting apparatus 2000, after the angle of the auxiliary light(s) has been adjusted according to one of the methods above, the first and second horns 2010 and 2012 can be permanently secured in position. This can prevent future adjustments of the angle of the auxiliary light(s) 2016. It may also be useful in particular situations, such as with off-road lights or when the auxiliary lighting system or light mounting apparatus 2000 is attached to a particular vehicle in a permanent fashion.

In addition to the first and second horns 2010 and 2012 being adjustable with respect to the cross member 2002, the outer ends of the first and second horns 2010 and 2012 may include at least one aperture (not shown) through which a fastener, including but not limited to locking pins, cotter pins, self-locking pins, bolts, screws or any other non-permanent fasteners identified within the sound judgment of a person of suitable skill in the art, may be inserted so as to secure a bracket to the outer end of the horns 2010 and 2012. In such embodiments, the top portion of the bracket houses the auxiliary light housing 2014. In certain embodiments, this bracket may be pivotable, allowing a user to further adjust the angle of illumination of the auxiliary lights 2016 relative to the ground. Pivoting of the bracket may be accomplished by loosening or tightening of a fastener (e.g., including but not limited to a screw or a nut and bolt), allowing the bracket to rotate the auxiliary light housing. Any adjustable bracket within the sound judgment of a person of suitable skill in the art may be used. In further embodiments, the outer ends of the first and second horns 2010 and 2012 may include multiple apertures located at various positions along the circumference of the first and second horns 2010 and 2012, allowing a user to adjust the position of the bracket and the auxiliary light housing 2014 at various positions along the circumference of the first and second horns 2010 and 2012.

Also provided is a method of adjusting an auxiliary light mounting apparatus. The method includes the steps of providing an auxiliary light mounting apparatus as described above; providing a power source to the auxiliary light mounting apparatus to illuminate at least one auxiliary light; measuring the angle of the at least one auxiliary light relative to the height of an associated vehicle and/or ground surface and comparing the measurement to desired, preselected angle ranges; if the measurement does not fall within the pre-selected ranges, rotating said first horn in a first direction to raise the at least one auxiliary light angle or rotating the first horn in a second direction to lower said at least one auxiliary light angle; taking a new measurement of the angle of the at least one auxiliary light relative to said height of the associated vehicle and/or ground surface; and fastening the first horn in place using the appropriate fasteners to secure the first and second horns with the cross member through the corresponding apertures.

While the apparatus and associated methods of use have been described above in connection with various illustrative embodiments, it is to be understood that other similar embodiments may be used, or modifications and additions may be made, to the described embodiments for performing the same function disclosed herein without deviating therefrom. Further, all embodiments disclosed are not necessarily in the alternative, as various embodiments may be combined or subtracted to provide the desired characteristics. Variations can be made by one having ordinary skill in the art without departing from the spirit and scope hereof. Therefore, the auto frame apparatus and associated methods of use should not be limited to any single embodiment, but rather construed in breadth and scope in accordance with the recitations of the appended claims. The right to claim elements and/or sub-combinations that are disclosed herein as other inventions in other patent documents is hereby unconditionally reserved.

Having thus described the disclosed system and method, it is now claimed:

1. A plow mounting apparatus for mounting a material handling box assembly on an associated vehicle having a chassis, such as a truck, comprising:
    a plow frame having at least a front portion and a rear portion;
    a lift frame attached to the rear portion of the plow frame, wherein the lift frame has a first side member and a second side member;
    a clevis frame attached to the rear portion of the plow frame;
    a vehicle mounting frame consisting of an upper cross member and a lower cross member, wherein the vehicle mounting frame is semi-permanently attached to the chassis of the associated vehicle, the lift frame includes a pair of upper hooks which engage the upper cross member on the vehicle mounting frame, and wherein the clevis frame includes a pair of lower hooks which engage the lower cross member on the vehicle mounting frame;
    a vertical pull structure attached to the lift frame, the vertical pull structure having an outer vertical sleeve and an inner vertical member slidingly engageable with the outer vertical sleeve;
    a height adjustment mechanism operable to raise and lower the material handling box assembly relative to the ground, the height adjustment mechanism comprising a hydraulic cylinder having a top portion and a bottom portion; the top portion being attached to the lift frame and the bottom portion being attached to a foot member, and;
    an adjustable auxiliary light mounting apparatus, comprising:
        a cross member positioned between the first side member and the second side member of the lift frame, wherein the cross member has a first end and a second end having an inner diameter and an outer diameter, and the cross member having at least one aperture at a first end and at least one aperture at a second end of the cross member;
        a first horn having a first end and a second end having an inner diameter and an outer diameter, wherein the outer diameter of the first end of the first horn is less than the inner diameter of the first end of the cross member, wherein the first end of the first horn is positioned within the first end of the cross member and wherein the first horn has at least one aperture positioned so as to overlap the at least one aperture at the first end of the cross member;
        a second horn having a first end and a second end having an inner diameter and an outer diameter, wherein the outer diameter of the second horn is less than the inner diameter of the second end of the cross member, wherein the first end of the second horn is positioned within the second end of the cross member and wherein the second horn has at least one aperture positioned so as to overlap the at least one aperture in the second end of the cross member;
        at least one first auxiliary light housing positioned at a top portion of the first horn and at least one second auxiliary light housing positioned at a top portion of the second horn;
        at least one light positioned within the first and second auxiliary light housings; and
        a pin inserted within the overlapping apertures of the first and second horns and the cross member so as to secure the horns within the cross member;
    wherein the material handling box assembly further comprises:
    a main blade consisting of a plate having a concave front surface opposite a convex rear surface; being elongated along its width to define a pair of lateral ends opposed to one another, the elongation defining an axis of elongation; and a plurality of substantially vertical, laterally spaced apart gussets engaged to the rear surface but absent from the lateral ends of the main blade;
    a guide frame engaged directly to the rear surface to provide structural support thereto, elongated in the width direction, extending the width of the blade; having a C-shaped cross section having a pair of opposing lips engaged to the rear surface where each of said lips extends toward the other lip; the guide frame defining a first half of a first slidable engagement set having an operational axis substantially parallel to the axis of elongation; and a first half of a second slidable engagement set having an operational axis substantially parallel to the axis of elongation; and
    a first wing blade assembly slidably engaged with the first half of a first slidable engagement set by a wing blade slide defining a second half of the first slidable engagement set; the state of being slidably engaged permitting the first wing blade assembly to be moved along the operational axis of the first slidable engagement set such that the width of the material handling box assembly may be adjusted; the first wing blade assembly comprising a wing blade having a front surface positioned behind and which is curved to conform with the rear surface; and a lateral edge plate defining a lateral containment surface.

2. The plow mounting apparatus of claim 1, further comprising an A-frame, wherein the plow blade pivotally attaches to a front portion of a the A-frame, the A-frame includes two side members and a rear member forming an A-shaped structure, the rear member of the A-frame includes a first pivotal mount and a second pivotal mount along its top surface, and the first pivotal mount and the second pivotal mount have an axis of rotation which allows for pivotal attachment of a clevis frame to the first pivotal mount and the second pivotal mount.

3. The plow mounting apparatus of claim 2, wherein the clevis frame includes a horizontal cross member between the first pivotal mount and the second pivotal mount and is pivotable along the axis of the first and second pivotal mount relative to the plow frame.

4. The plow mounting apparatus of claim 3, wherein the inner vertical member has a bottom end which is attached to the horizontal cross member of the clevis frame and the outer vertical sleeve is attached to a cross member on the lift frame.

5. The plow mounting apparatus of claim 4, wherein the bottom portion of the hydraulic cylinder is pivotally attached to the foot member and wherein the foot member comprises a metal plate and supports the plow assembly off of a ground surface when the plow assembly is not installed on the associated vehicle.

6. The plow mounting apparatus of claim 5, wherein the foot member and hydraulic cylinder are positioned within an interior portion within the A-frame.

7. The plow mounting apparatus of claim 6, wherein the foot member further comprises a foot member-clevis frame connecting member that permanently attaches the foot member to the horizontal cross member of the clevis frame, and the foot member-clevis frame connecting member is angled to extend upward from the foot member and to pass over the top portion of the rear member of the A-frame.

8. The plow mounting apparatus of claim 7, wherein the foot member, hydraulic cylinder, clevis frame, lift frame and vertical pull structure pivot as a single unit along the axis of rotation between the first and second pivotal mount on the rear member of the A-frame.

9. The plow mounting apparatus of claim 8, wherein the outer vertical sleeve comprises a hollow cylindrical structure; the inner vertical member comprises an inner cylindrical structure; the outer vertical sleeve has at least one aperture; the inner vertical member has at least one aperture, and wherein the outer vertical sleeve and the inner vertical member may be slidingly engaged so that the corresponding apertures on the outer vertical sleeve and the inner vertical member overlap such that a locking mechanism may be disposed within the aperture of the outer vertical sleeve and wherein the locking mechanism may engage the aperture on the inner vertical member to mechanically lock the outer vertical sleeve and the inner vertical member of the vertical pull structure into a fixed position relative to each other.

10. The plow mounting apparatus of claim 9, wherein the locking mechanism is an automatic locking pin.

\* \* \* \* \*